(12) United States Patent
Jensen

(10) Patent No.: US 7,942,658 B1
(45) Date of Patent: May 17, 2011

(54) SYSTEMS FOR FORMING LIGHTWEIGHT CONCRETE BLOCK

(75) Inventor: Daniel M. Jensen, Salt Lake City, UT (US)

(73) Assignee: Advanced Building Systems, Inc., Draper, UT (US)

( * ) Notice: Subject to any disclaimer, the term of this patent is extended or adjusted under 35 U.S.C. 154(b) by 2395 days.

(21) Appl. No.: 09/661,731

(22) Filed: Sep. 14, 2000

Related U.S. Application Data

(63) Continuation of application No. 09/396,594, filed on Sep. 15, 1999, now Pat. No. 6,676,862.

(51) Int. Cl.
  *B29C 44/02* (2006.01)
  *B29C 44/40* (2006.01)
(52) U.S. Cl. .................... 425/4 R; 425/258
(58) Field of Classification Search ............. 425/4 R, 425/258, 817 R
  See application file for complete search history.

(56) References Cited

U.S. PATENT DOCUMENTS

| | | | | |
|---|---|---|---|---|
| 1,433,300 A | * | 10/1922 | Quillet | |
| 1,554,585 A | * | 9/1925 | Lake | |
| 2,052,324 A | * | 8/1936 | Thomson | |
| 2,131,474 A | * | 9/1938 | Henderson | |
| 2,283,968 A | * | 5/1942 | Bunch | |
| 2,585,193 A | * | 2/1952 | Vesper | |
| 2,598,254 A | * | 5/1952 | Grueneberg | |
| 2,856,668 A | * | 10/1958 | Cravens | |
| 3,062,669 A | | 11/1962 | Dilnot | |
| 3,177,281 A | * | 4/1965 | Umansky | |
| 3,318,563 A | * | 5/1967 | Downing | |
| 3,537,156 A | * | 11/1970 | Glass | ............ 425/258 |
| 3,558,107 A | | 1/1971 | Williams | |
| 3,602,358 A | | 8/1971 | Jakobsson | |
| 3,618,279 A | | 11/1971 | Sease | |
| 3,640,511 A | | 2/1972 | Dils, Jr. | |
| 3,661,604 A | | 5/1972 | Artmann | |
| 3,708,148 A | | 1/1973 | Göransson | ............ 249/111 |
| 3,780,484 A | | 12/1973 | Muse | |
| 3,792,608 A | * | 2/1974 | Holm et al. | |
| 3,809,516 A | | 5/1974 | Komaki | ............ 425/150 |
| 3,867,159 A | | 2/1975 | Ergene | |
| 3,902,911 A | | 9/1975 | Messenger | |
| 3,905,586 A | * | 9/1975 | Wall, Jr. | |
| 3,917,781 A | * | 11/1975 | Gabriel et al. | ............ 264/333 |
| 3,922,413 A | * | 11/1975 | Reineman | |
| 3,936,987 A | * | 2/1976 | Calvin | |
| 3,979,217 A | | 9/1976 | Sutton | |
| 4,050,865 A | * | 9/1977 | Drostholm et al. | ............ 425/183 |
| 4,057,608 A | | 11/1977 | Hashimoto et al. | ............ 264/42 |
| 4,069,809 A | | 1/1978 | Strand | |

(Continued)

FOREIGN PATENT DOCUMENTS

EP  0428756 B1  5/1984

(Continued)

*Primary Examiner* — Robert B Davis
(74) *Attorney, Agent, or Firm* — Stoel Rives LLP

(57) ABSTRACT

A method and apparatus for efficiently forming individual building units is provided, generally includes providing a plurality of molds, each capable of simultaneously forming a plurality of building units. Batches of cementitious slurry are individually mixed in order to control the density of each building unit formed. The ingredients are individually measured and combined into the mixing device. The cementitious slurry is then conveyed or transported and poured into one of the molds. The method provides the ability to control the amount of cementitious slurry in each batch in order to control to the extent possible the quantity of cementitious slurry poured into each mold and the ability to precisely control the dimensions of each building unit produced.

23 Claims, 21 Drawing Sheets

U.S. PATENT DOCUMENTS

| | | | |
|---|---|---|---|
| 4,124,669 A | 11/1978 | Urmston | 264/42 |
| 4,125,979 A | 11/1978 | McLaughlin | |
| 4,135,940 A | 1/1979 | Peltier | 264/42 |
| 4,138,892 A | 2/1979 | Davis | 249/170 |
| 4,167,549 A * | 9/1979 | Creskoff | 264/42 |
| 4,174,936 A | 11/1979 | Göransson | 425/385 |
| 4,229,393 A * | 10/1980 | Wesche et al. | 264/333 |
| 4,232,494 A * | 11/1980 | Bauch et al. | |
| 4,265,979 A * | 5/1981 | Baehr et al. | 264/121 |
| 4,268,317 A | 5/1981 | Rayl | |
| 4,303,722 A * | 12/1981 | Pilgrim | |
| 4,329,178 A | 5/1982 | Kalvenes et al. | |
| 4,351,670 A | 9/1982 | Grice | |
| 4,357,289 A | 11/1982 | Jakobsson | 264/42 |
| 4,372,092 A | 2/1983 | Lopez | |
| 4,373,955 A | 2/1983 | Bouchard et al. | |
| 4,383,862 A | 5/1983 | Dyson | |
| 4,398,958 A | 8/1983 | Hodson et al. | |
| 4,415,366 A | 11/1983 | Copening | |
| 4,422,989 A | 12/1983 | Hums et al. | 264/42 |
| 4,465,719 A | 8/1984 | Grice | |
| 4,466,833 A | 8/1984 | Spangle | |
| 4,475,326 A | 10/1984 | Hanson | |
| 4,501,830 A | 2/1985 | Miller et al. | |
| 4,528,883 A | 7/1985 | Goransson et al. | |
| 4,547,331 A | 10/1985 | Batstra | 264/333 |
| 4,587,279 A | 5/1986 | Salyer et al. | |
| 4,613,472 A | 9/1986 | Svanholm | 264/42 |
| 4,613,627 A * | 9/1986 | Sherman et al. | 264/45.3 |
| 4,648,223 A | 3/1987 | Richard | |
| 4,655,979 A * | 4/1987 | Nakano et al. | 264/42 |
| 4,659,054 A | 4/1987 | Allen | 249/7 |
| 4,673,437 A | 6/1987 | Gelbman | 264/336 |
| 4,694,629 A | 9/1987 | Azimi | |
| 4,726,923 A | 2/1988 | Richard | 264/250 |
| 4,729,859 A | 3/1988 | Munsey et al. | 264/71 |
| RE32,673 E * | 5/1988 | Schubert et al. | 264/42 |
| 4,789,244 A | 12/1988 | Dunton et al. | |
| 4,828,618 A | 5/1989 | De Chiffre et al. | |
| 4,830,508 A * | 5/1989 | Higuchi et al. | 366/152 |
| 4,836,762 A * | 6/1989 | Davis, Jr. | 425/89 |
| 4,871,395 A | 10/1989 | Sugama | |
| 4,872,913 A | 10/1989 | Dunton et al. | |
| 4,895,450 A | 1/1990 | Holik | |
| 4,895,598 A | 1/1990 | Hedberg et al. | |
| 4,900,359 A | 2/1990 | Gelbman | |
| 4,902,211 A | 2/1990 | Svanholm | 425/88 |
| 4,904,427 A * | 2/1990 | Kojima | 264/42 |
| 4,932,786 A | 6/1990 | Hihara et al. | |
| 4,941,813 A | 7/1990 | Grubb, Jr. et al. | 425/195 |
| 4,961,887 A * | 10/1990 | Crumpler et al. | 264/40.4 |
| 4,966,463 A * | 10/1990 | Hihara et al. | 366/3 |
| 5,002,620 A | 3/1991 | King | |
| 5,024,035 A | 6/1991 | Hanson et al. | |
| 5,074,774 A * | 12/1991 | Nose et al. | 425/260 |
| 5,078,586 A * | 1/1992 | Holzschuh | 425/195 |
| 5,102,228 A | 4/1992 | Vine-Lott | |
| 5,110,084 A * | 5/1992 | Hihara et al. | 264/333 |
| 5,110,839 A | 5/1992 | Chao | |
| 5,112,405 A | 5/1992 | Sanchez | |
| 5,114,617 A * | 5/1992 | Smetana et al. | |
| 5,183,505 A | 2/1993 | Spinney | |
| 5,226,275 A | 7/1993 | Trahan | |
| 5,278,194 A * | 1/1994 | Tickner et al. | |
| 5,375,991 A * | 12/1994 | Rydmann et al. | 425/144 |
| 5,379,565 A | 1/1995 | Vienne | |
| 5,387,282 A | 2/1995 | Jakel | |
| 5,397,228 A * | 3/1995 | Metten | 425/290 |
| 5,397,516 A | 3/1995 | Sikaffy | 264/42 |
| 5,421,135 A | 6/1995 | Stevens et al. | |
| 5,457,926 A | 10/1995 | Jensen | |
| 5,472,498 A | 12/1995 | Stephenson et al. | |
| 5,494,513 A | 2/1996 | Fu et al. | |
| 5,518,312 A | 5/1996 | Inoue et al. | 366/293 |
| 5,519,971 A * | 5/1996 | Ramirez | |
| 5,522,658 A | 6/1996 | John | 366/15 |
| 5,531,586 A * | 7/1996 | Hyde | 425/352 |
| 5,564,823 A | 10/1996 | Holik | 366/6 |
| 5,566,521 A | 10/1996 | Andrews et al. | |
| 5,569,426 A | 10/1996 | Le Blanc | 264/122 |
| 5,587,187 A * | 12/1996 | Benade | 425/406 |
| 5,595,595 A * | 1/1997 | Glenn | |
| 5,595,596 A | 1/1997 | Marcotullio et al. | |
| 5,709,827 A * | 1/1998 | Andersen et al. | 264/42 |
| 5,775,047 A | 7/1998 | Jensen | |
| 5,791,109 A * | 8/1998 | Lehnert et al. | |
| 5,797,238 A * | 8/1998 | Berntsson et al. | 264/256 |
| 5,802,793 A | 9/1998 | DeVore, Jr. | |
| 5,811,135 A * | 9/1998 | Kimura | 425/186 |
| 5,814,255 A | 9/1998 | Weiser et al. | 425/110 |
| 5,834,082 A * | 11/1998 | Day | |
| 5,852,077 A | 12/1998 | Zawada et al. | |
| 5,871,677 A * | 2/1999 | Falke et al. | 264/42 |
| 5,881,524 A * | 3/1999 | Ellison, Jr. | |
| 5,927,032 A * | 7/1999 | Record | |
| 5,930,964 A | 8/1999 | Boehning | |
| 6,083,318 A * | 7/2000 | Zawanda et al. | |

FOREIGN PATENT DOCUMENTS

| | | |
|---|---|---|
| EP | 0060950 B1 | 9/1985 |
| EP | 0090781 B1 | 11/1986 |
| EP | 0241473 B1 | 9/1989 |
| EP | 0722916 A1 | 7/1996 |
| EP | 0573654 B1 | 3/1997 |
| EP | 0644024 B1 | 7/1998 |
| GB | 359086 A * | 10/1931 |
| GB | 2122127 A | 1/1984 |
| GB | 2 124 538 A * | 2/1984 |
| JP | 64009880 A | 1/1989 |
| JP | 03034803 A * | 2/1991 |
| JP | 3-75131 A * | 3/1991 |
| JP | 04198056 A | 7/1992 |
| JP | 06321650 A | 11/1994 |
| JP | 07048183 A | 2/1995 |
| JP | 09110553 A | 4/1997 |
| WO | WO 80/00811 | 5/1980 |
| WO | WO88/06084 | 8/1988 |
| WO | WO93/08007 | 4/1993 |
| WO | WO93/24425 | 12/1993 |
| WO | WO96/28289 | 9/1996 |
| WO | WO97/06120 | 2/1997 |

* cited by examiner

SYSTEMS FOR FORMING LIGHTWEIGHT CONCRETE BLOCK

This is a continuation of U.S. application Ser. No. 09/396,594 filed Sep. 15, 1999 now U.S. Pat. No. 6,676,862, currently pending.

BACKGROUND OF THE INVENTION

1. The Field of the Invention

This invention relates generally to lightweight concrete block and a method and apparatus for making lightweight concrete block, and more particularly to a method and apparatus for making lightweight concrete blocks that are capable of being dry stacked and have an impact resistant outer surface.

2. Background

The use of lightweight concrete for building construction has been known for decades. Aerated, lightweight concrete has many desirable properties for use in the building construction industry. For example, it is typically easier to handle because of its decreased weight compared to conventional concrete structures. Furthermore, aerated lightweight concrete often has an "R value" or insulative properties that eliminate or substantially decrease the need for additional insulation. Aerated lightweight concrete is also fire resistant so that any buildings built with such materials are less likely to be destroyed by fire.

Aerated, lightweight concrete is typically formed by one of two methods. One method involves mixing cement with an aerated foaming agent to form a cementitious slurry having air cells entrained therein. For example, as disclosed in U.S. Pat. No. 3,062,669 to Dilnot, a lightweight concrete is formed by combining Portland cement, ground silica, fibers, sodium silicate, water and a stable, preformed foam prepared by incorporating air into a hydrolyzed protein foaming agent. Similarly, in U.S. Pat. No. 3,867,159 to Ergene, cellular concrete structures are made by mixing water, cement, and a foam into a foamed cementitious slurry which is then cast in a mold and cured.

Another method includes adding alumina powder to the cement mixture. The alumina powder reacts with the cement mixture to form gas bubbles which cause aeration of the cement mixture. In order to form individual blocks of the lightweight concrete, the aerated cement mixture is often poured into a mold and allowed to harden around the air cells to form an aerated, lightweight concrete block.

Several approaches in the art have been employed to form aerated, lightweight concrete building units that are suitable for building purposes. In order for the lightweight concrete building units to be suitable for building purposes, they must have sufficient structural integrity, e.g., compressive strength, to meet building code requirements and they should be uniform in size and shape to be practical for use in the construction industry. In addition, the building units must be manufacturable in an efficient enough manner and in sufficient quantities to support demands required by the building construction industry. As such, one method known in the art of producing individual blocks is to form larger blocks of lightweight concrete and then cut the larger blocks into smaller building units while the cement is still in a partially cured or "green" state.

When employing cutting methods to form smaller building units, whether the initial larger block is formed by using alumina powder to cause the cement mixture to "rise" or the initial block is formed by forming a foamed cement slurry by adding a stable foam to the mixture, the resultant cement slurry is poured into a large mold and allowed to at least partially cure into a relatively large block. For cement slurries that "rise," the height of the block within the mold is dependent upon the amount of aeration or gas generation that occurs within the cement mixture and the amount of gas that is entrained within the cement mixture when the mixture begins to harden. For cement slurries to which a stable foam has been added prior to being poured into a mold, the height of the block in the mold is determined by the amount of prefoamed cement slurry poured into the mold and the amount of air that escapes from the cement slurry before the viscosity of the cement slurry increases to a point where the air cells can no longer migrate within the mixture. Once the cement has hardened or cured to a degree where the formed block can be handled, the block may be removed from the mold and cut into smaller blocks of a desired size and shape. Because the height of the initially formed block is somewhat unpredictable, there is often significant amounts of scrap material produced during such block forming processes. That is, it is often the case that at least a top layer of the initially formed block is wasted. Examples of cutting apparatuses for cutting larger blocks into smaller building units are described in U.S. Pat. No. 4,174,936 to Goransson and U.S. Pat. No. 4,528,883 to Goransson et al.

When casting aerated cement compositions, it is common to find that the density of the block formed varies from top to bottom. That is, prior to solidification of the cement slurry, the gas cells migrate to the top of the block resulting in a block that has a greater density nearer the bottom of the block. Accordingly, individual building units that are cut from a larger block will vary in density resulting in blocks of varying structural strength and weight. In order to compensate for the varying density in individual building units, the density of the entire composition of the aerated slurry must be increased so that the least dense building nits have sufficient structural integrity.

In processes where the individual building units are cut from a larger block, a mortar or some other binding agent must be employed in order to use the building units for construction purposes. In addition, because each building unit has an outer surface that is comprised of open cells, water is easily absorbed into the building units. As such, the surface of the individual building units must typically be treated with a water repellant material to prevent water from absorbing into the block. This is especially important in colder climates where absorption of water can cause the building units to fracture as the water therein expands during solidification. Because of this known phenomenon, such building materials are often required to pass a "freeze/thaw test." In the freeze/thaw test, the material is submersed in water for an extended period of time and then frozen. If the material cracks, crumbles, or is otherwise structurally compromised, the material will not be approved for use in construction.

Other methods for forming individual building units include individual casting in a mold. For example, as shown in U.S. Pat. No. 5,522,685 to John, the building units are each formed by pouring lightweight cement slurry into a mold to form a cast body and then combining pairs of cast bodies into individual building units. In U.S. Pat. No. 4,372,092 to Lopez, modular panels are individually formed by pouring a cement slurry into a single panel mold having desired components incorporated therein. Such methods for forming individual building units are typically not very efficient at producing large quantities of building units in a relatively short period of time. As such, the cost per unit is relatively high compared to conventional construction materials resulting in products that have not been very commercially successful.

One approach in the art to overcome the foregoing disadvantages with prior art systems is disclosed in U.S. Pat. Nos. 5,457,926 and 5,775,047 to Jensen, the inventor of the present invention, each of which are herein incorporated by this reference. In both references, a lightweight interlocking building block is disclosed in which the blocks may be stacked without the use of mortar. U.S. Pat. No. 5,775,047 teaches that the size of the bubbles entrained in the slurry produce a block having desired compressive and shear strengths. Neither reference, however, describes the method or apparatuses for forming such blocks. Furthermore, there is no teaching of the method or apparatus by which such blocks can be formed in a uniform manner to produce building units having substantially equal dimensions and relatively equivalent densities.

As such it would be advantageous to provide a method and apparatus for forming individual building units in an efficient and cost effective manner.

It would also be advantageous to provide a method and apparatus for forming individual building units having substantially uniform dimensions and relatively consistent densities for each building unit produced.

It would be a further advantage to provide a method and apparatus for forming individual building units in which the building units can be dry stacked without the need for mortar.

It would still be a further advantage to provide a method and apparatus for forming individual building units in which the building units have an impact resistant outer surface.

It would be yet another advantage to provide a method and apparatus for forming individual building units in which the density of the building units can be altered while maintaining the dimensions of the building units.

It would be another advantage to provide a method and apparatus for forming individual building units in which the density of the building units is relatively low while maintaining structural integrity sufficient to meet or exceed building requirements.

It would also be advantageous to provide a method and apparatus for forming individual building units in which the system for forming such building units is fully automated.

SUMMARY OF THE INVENTION

Accordingly, a method and apparatus for forming individual building units is provided, generally comprising an ingredient measuring apparatus, an automated cement slurry mixing apparatus, an automated cement slurry delivery apparatus, and at least one mold. The slurry is preferably comprised of cement, sand, water and foam. In a preferred embodiment, fibers are also added to the slurry to increase the structural integrity of the building units. Various aspects of the invention include the ability to control the amount of cementitious slurry in each batch in order to control to the extent possible the quantity of cementitious slurry poured into each mold and thus the density of the resulting building units and the ability to precisely control the dimensions of each building unit produced.

In a preferred embodiment of the present invention, an automated process for forming lightweight concrete building units is provided. The method includes providing a plurality of molds that are preferably laid out in rows and positioned on either side of a weighing and mixing device. Similarly, the molds may be placed on a turntable and sequentially positioned beneath the mixing device to receive batches of cementitious slurry. Each mold is preferably capable of simultaneously forming a plurality of building units.

Preferably, batches of cementitious slurry are individually mixed in order to control the properties, such as the density, of each building unit formed. To create a first single batch of cementitious slurry, the ingredients are individually measured and combined into a mixing device. The ingredients are then mixed for a period of time until a cementitious slurry is adequately formed. While the ingredients are being mixed, the resulting cementitious slurry is being conveyed or transported to one of the molds. In addition, while the first batch is mixing, a second batch of ingredients is being weighed in order to be dispensed into the mixing device after the first batch is dispensed from the mixing device.

Upon mixing of the second batch, the second batch is transported and poured into another mold while a third batch of ingredients is being measured for dispensing into the mixing device and for mixing to form a third batch of cementitious slurry. Additional batches are mixed, transported, and poured into additional molds until the first batch has cured to at least a point where the building units within the mold can be handled.

In another preferred embodiment, while the first batch is being transported and poured into one mold, a second batch of ingredients is being dispensed into the mixing device and mixed to form a second batch of a cementitious slurry.

After the building units have cured to a state where the building units are rigid enough to be handled, the building units are removed from their respective molds and transported to a storage area. This process is preferably continuously repeated so that as building units are removed from their respective mold, the mold is prepared, as by rinsing and/or applying a release agent (e.g., oil), for receiving another batch of cementitious slurry. As such the present invention provides a process where there is relatively little time when a particular mold in the process does not contain a batch of cement, except of course when the process is first started and all of the molds are initially empty.

In a preferred embodiment, the number of molds is dependent upon the process time. Preferably, however, the number of molds is approximately equal to the time between the start of a mix cycle for a batch of cementitious slurry and when the building units resulting from the batch are removed from their respective mold, divided by the time it takes to mix each batch and pour each batch into an individual mold. Such a process is highly advantageous as it maximizes the usage of each mold and maximizes the efficiency of the process.

In another preferred embodiment, the ingredients are measured by weight in which a first dry ingredient is poured onto a scale and weighed to approximately a first weight. A second dry ingredient is then added to the scale and weighed to a second weight. Additional ingredients as desired may be weighed and added to the mixture in a similar manner. The dry ingredients are then poured into a mixer to which metered amounts of foam and water are added in sufficient quantities to form a cementitious slurry having desired characteristics. Preferably, the amount of water and foam are metered by injecting these liquid ingredients for predetermined timed periods. By knowing the rate of flow (i.e., flow volume per unit time) for such liquid ingredients, relatively precise amounts can be metered into the mixture. In a preferred embodiment, the water is added to the mixing device prior to the addition of any dry ingredients in order to rinse the inside of the mixing device between batches.

One of the difficulties known in the art has been the inability to form batches of cementitious slurry with relatively consistent characteristics (i.e., density, even dispersion of aeration, quantities of ingredients, etc.) The present invention, however, solves these problems by using weighted amounts of dry ingredients and metered amounts of liquid ingredients to obtain relatively consistent quantities of ingredients in each batch. For controlling the quantities of the dry ingredients, which quantities typically have a greater affect on the characteristics of the finished product, each ingredient is metered at a first rate to approximately 90 percent of the desired weight (e.g., 90 percent). Each ingredient is then metered at a second slower rate to the desired weight. As such, the quantity of each ingredient can be more precisely controlled by adding the last amount of each ingredient at a slower rate without significantly decreasing the overall time it takes for each ingredient to be properly measured.

In a preferred embodiment, in order to further reduce the number of molds required while maximizing usage of the mixing device, the temperature of the cementitious slurry is kept at an elevated temperature of preferably about 80-120 degrees Fahrenheit. This temperature range is dependent upon the characteristics of the foaming agent selected. Specifically, foaming agents typically have a critical temperature above which the foaming agent will fail to produce a foam. In addition, there is typically a critical range of temperatures below the critical temperature at which the foaming agent will foam to some extent. For example, at a lower end of this critical temperature range, the foaming agent will foam quite well, while at a temperature nearer but less than the critical temperature the ability of the foaming agent to foam is reduced. Preferably, the foamed cementitious slurry is mixed at a temperature at or near the lower end of the critical temperature range to maximize foaming efficiency.

There is also often a second critical temperature of the foaming agent in slurry above which the foam will quickly destabilize (i.e., collapse). Often, but not necessarily, this second critical temperature is at or near the first critical temperature. Because, however, the foam will be mixed with the cementitious slurry, the slurry itself affects the temperature at which the foam will destabilize. In order to locally destabilize the foam at the interface between the mold and the slurry to create an outer hardened shell around each building unit produced, the mold is preferably heated above this second critical temperature or at least above the first critical temperature to obtain a desired shell thickness in the block. Knowing the temperature sensitive characteristics of the foaming agent (both alone and when mixed with a cement slurry) allows the other process parameters to be set to maximize the foaming efficiency of the foaming agent while encouraging quicker curing of the cement slurry and formation of an outer shell by the addition of heat. Those skilled in the art, will appreciate that the temperature may be kept at other temperatures depending upon the temperature sensitivity of the characteristics of the ingredients and the desired cure time.

Preferably, the temperature of the process is increased or decreased depending on the characteristics of the foaming agent used and the temperature at which the foam will maintain its air cells without significant breakdown. Heating of the cementitious slurry is desirable to decrease the cure time for each batch since the rate of cure for conventional cement products is typically proportional to the temperature. An objective of the present invention is to maximize the cure rate by maintaining the slurry at a temperature that is as near as possible to the critical temperature of the foam without compromising the stability of the foam. However, those skilled in the art will appreciate that lower temperatures may be employed in accordance with the present invention even though such lower slurry temperatures result in slower cure rates and may allow additional migration and coalescing of air cells during the curing process. Likewise, higher temperatures may be employed if a proper foaming agent is selected that can withstand higher temperatures.

In a preferred embodiment, a foaming agent is selected that has a critical temperature of approximately 110 to 120 degrees Fahrenheit (i.e., the temperature at which the resulting foam breaks down and its air cells collapse). The water that is added to the mixture is preferably heated to approximately 100 degrees Fahrenheit so that the stability of the foam is not compromised. When mixed with the dry ingredients (e.g., cement and sand), the mixture equalizes to approximately 80-90 degrees Fahrenheit. Finally, the mold is heated to approximately 170-220 degrees Fahrenheit. This temperature is preferred as it sufficiently collapses the air cells without substantially affecting the integrity of the cement. However, the higher the temperature of the mold, the thicker the dense outer layer of the building unit becomes. As such, the foaming agent remains stable during the mixing process as the heated slurry is below the critical temperature of the foam. As the cementitious slurry is poured into the mold, the air cells in the slurry that contact the surface of the heated mold collapse producing an outer layer of cement with fewer air cells. The use of a heated cementitious slurry in conjunction with the aid of the heated mold quickly cures the slurry such that the entrained air cells are prevented from coalescing, interconnecting, or migrating. Thus, the air cells remain evenly dispersed throughout the slurry. The hardened outer shell produced by the heated mold produces a dense outer layer that reduces the ability of the cement to draw in water by capillary action.

Preferably, in accordance with the method of the present invention, the batch of cementitious slurry is mixed as it is transported to a mold, such that the mixing time does not significantly delay the process. As such, the mixing device itself is transported to a mold while mixing is in progress and the slurry is poured into the mold upon arrival at the mold. Mixing the cementitious slurry while it is being transported to the mold keeps the cementitious slurry workable to prevent the slurry form setting during transport. After dispensing the slurry into a mold, the mixing device returns to the ingredient metering apparatus to receive a new batch of ingredients for mixing. The present invention thus utilizes mixing time during transport and allows each batch to be mixed for substantially the same amount of time for each mold. Maintaining consistent mixing times while keeping the transport time relatively short, allows each batch to cure an equal amount in each mold.

In a preferred embodiment, the first batch is transported at a first speed to within a relatively short distance of the first mold and then transported at a second slower speed to a substantially precise position relative to the first mold. As such, the position of the mixing device can be relatively precisely controlled while increasing the speed of the overall transporting operation. This transporting operation is repeated for each of the other molds.

Preferably, the cementitious slurry is comprised of sand, cement and water. In yet another preferred embodiment, fibers are added to the slurry to add structural integrity to the finished building units. In still another preferred embodiment, an additional cement is added to the mixture wherein the additional cement is a quick setting cement that decreases the curing time of each building unit. Utilizing such a dual cement mixture creates a cementitious composition that has the structural properties and cost savings of longer setting cement while taking advantage of the decrease in curing time resulting from the addition of the quicker setting cement. Decreasing the curing time of the cementitious slurry decreases the number of molds required for the process in accordance with the present invention in which molds are systematically and continuously filled while slurry batches in other molds are curing.

After the individual building units have cured to a point where they can be safely handled, if necessary, the building units are transported to a hydration station where water is applied to the building units in order to properly hydrate the cement. Of course, the cement may already contain enough water for proper hydration without requiring additional water. In addition, it is also contemplated in accordance with the present invention that the building units may be placed in an autoclave to aid the curing process.

In yet another preferred embodiment of the present invention, the aerated cementitious slurry is compressed while inside the mold. More specifically, the slurry is compressed a relatively precise amount to form an individual building unit having substantially precise dimensions. As such, each building unit produced will have precisely the same dimensions. Indeed, building units manufactured in accordance with the present invention are capable of having a tolerance of +/−0.03 inches. Maintaining control over the dimensions of the finished building units allows the building units to be dry stacked without resulting in appreciable variations in wall height as the building units are stacked. That is, using building units of substantially equal dimensions to build a structure results in walls that do not substantially vary in height along their length.

Controlling the dimension of each building unit produced is preferably accomplished by compressing the aerated cementitious slurry within the mold in at least one direction such that a precise internal volume within the mold is achieved to form lightweight concrete building units having substantially precise volumes and dimensions when cured. In addition, by metering the ingredients in such a relatively precise manner as herein disclosed, the density of each block will be substantially uniform for each block.

Compressing the cementitious slurry also causes air cells proximate outer surfaces of the lightweight building unit to collapse resulting in a lightweight building unit having an impact resistant outer surface or shell when cured. The use of compression techniques in accordance with the principles of the present invention may also be employed to imprint a texture or pattern on at least one outer surface of the lightweight building unit.

In this process it is also beneficial to cause the cementitious slurry to cure to a handleable point as quickly as possible in order to maintain the aeration that is entrained within the cementitious slurry in the cured building unit. One way of decreasing the cure time of the cementitious slurry is to heat the water that is added to the mixture (e.g., to a temperature at or near 140 degrees Fahrenheit). In addition, heating the molds (e.g., to a temperature at or above approximately 180 degrees Fahrenheit) also speeds the cure time of each building unit. In fact, building units manufactured in accordance with the principles of the present invention can cure to a handleable state in approximately ten (10) minutes or less. It is preferable that the molds be heated by circulating heated water through the molds. In a preferred embodiment, the heated water that is added to the cementitious slurry and the water utilized to heat the molds is supplied from a common source.

In still another preferred embodiment, the foaming agent utilized to aerate the cementitious slurry has a first critical temperature of approximately 100 degrees Fahrenheit (i.e., the temperature above which the foaming agent will not produce a stable foam). The foaming agent is heated to about 80 degrees Fahrenheit, agitated into a foam, and added to the cementitious slurry for mixing therein. In a preferred embodiment, the heated water added to the foaming agent is from the same source of heated water that supplies water to the mix for forming each batch of cementitious slurry so long as the temperature of the water is not above the first critical temperature of the foaming agent. The mold is preferably heated above a second critical temperature of the foaming agent (i.e., the critical temperature of the foam itself or the temperature at which the foam destabilizes).

Other objects and advantages of the present invention will become apparent upon reading the following detailed description and appended claims, and upon reference to the accompanying drawings.

DETAILED DESCRIPTION OF THE PREFERRED EMBODIMENTS OF THE INVENTION

Figure 1:
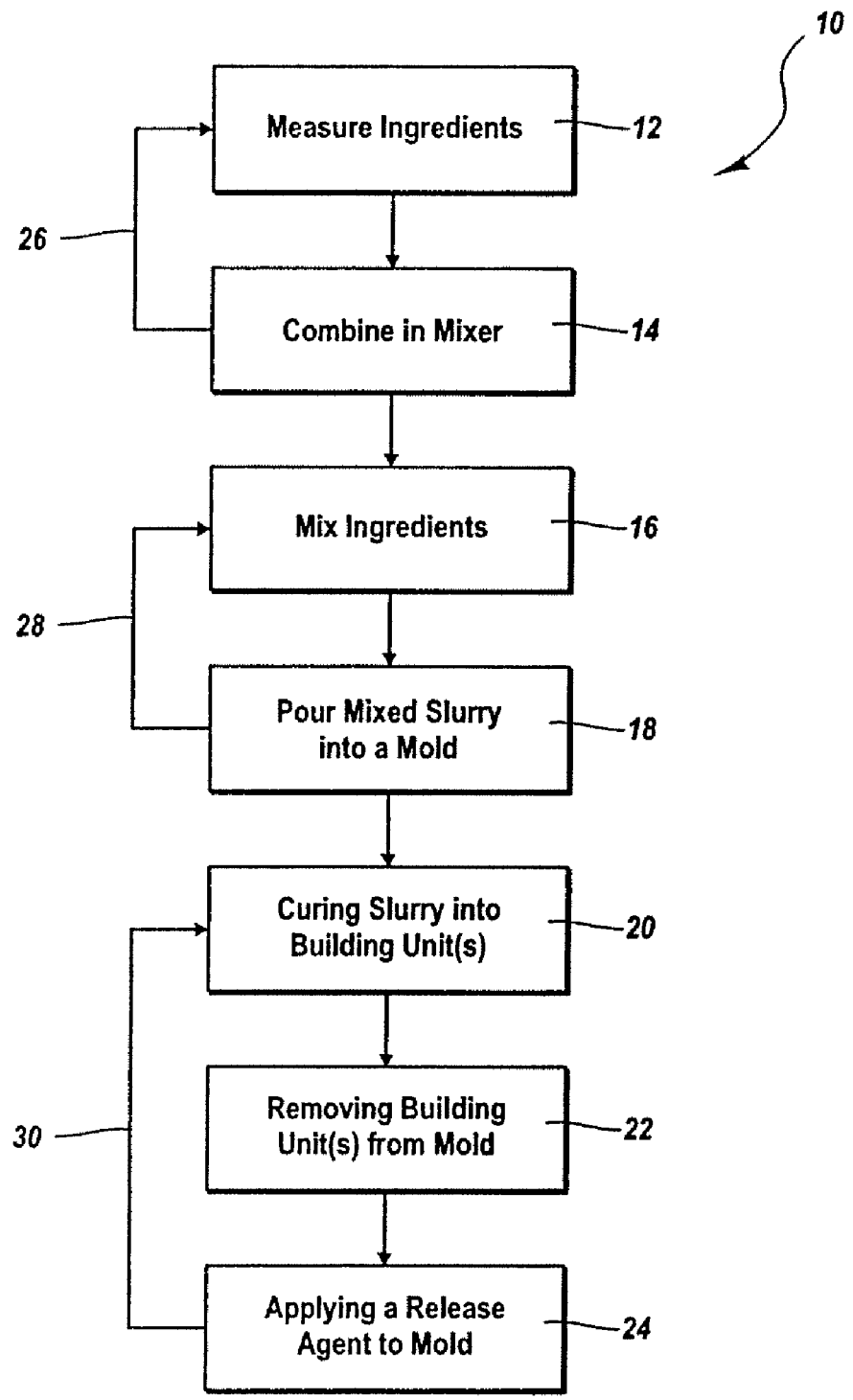
FIG. 1 is a schematic block flow diagram illustrating a first preferred embodiment of a process for forming lightweight concrete building units in accordance with the principles of the present invention.

Reference is now made to the drawings wherein like parts are designated with like numerals throughout. The present invention is directed to a method for forming lightweight cementitious building units that are amenable to being dry stacked, that is, stacked to form buildings and other structures without the use of mortar or other such compounds. Specifically, with reference to FIG. 1, a block diagram illustrating the process, generally indicated at 10 for manufacturing such lightweight cementitious building units is shown in accordance with the principles of the present invention. As illustrated in FIG. 1, an automated process, generally indicated at 10, for forming lightweight concrete building units comprises the steps of measuring 12 the ingredients necessary for forming a first batch of an aerated lightweight concrete slurry, combining 14 those ingredients in a mixer, mixing 16 the ingredients into a first batch of aerated cementitious slurry, and pouring 20 the ingredients into a mold. While the first batch is mixing 16, the "dry" ingredients (e.g., cement, sand, quick setting cement) sufficient to form a second batch of aerated cementitious slurry are measured 12 and await emptying of the first batch from the mixer. As the first batch is being mixed 16, it is also being delivered (i.e., transported) to the mold such that the mixing time is utilized to transport the batch to a mold. Upon delivery of the first batch to a mold, the mixer is quickly returned to receive the next batch of weighed ingredients. The second batch is then mixed 16 while the dry ingredients for a third batch of slurry are being measured 12. Additional batches are mixed 16 and poured 18 into additional molds until the first batch has cured to a "green" state (i.e., to at least a point where the resulting building unit(s) can be safely handled). As such, dry ingredients are either measured 12 or being dispensed into the mixer and combined 14 with water and foam. Likewise, the mixer is either being emptied 18 and returned for receiving additional batches of ingredients or is mixing 16 ingredients to form a batch of cementitious slurry and transporting the ingredients to a mold.

Once the first batch of cementitious slurry is cured 20 to a point where the resulting building unit(s) can be safely handled, the process further includes removing 22 the building unit(s) from the first mold, applying 24 a release agent to the mold and repeating the process for that mold. As illustrated in FIG. 1, the process is divided into three main stages including dry ingredient measuring 26, mixing 28, and curing in mold 30. Each of these stages 26, 28 and 30 are repeated as quickly as possible. That is, while the mixing stage 28 is occurring for one batch of materials, the measuring and curing in mold stages 26 and 30, respectively, are being performed for other batches of materials. As such, usage of each of the physical structures to perform the process is efficiently maximized. Further, because the cost of each mold is relatively high, increasing the speed of the process and decreasing curing time decrease the number of molds required to be able to continuously run the operation without interruption. More specifically, the number of molds necessary for continuous operation when employing a single mixer is approximately equal to the time required to pour 18 the mixed slurry into a mold and remove 22 the building units from the mold divided by the time required to combine 14 the ingredients in the mixer and pour 18 the mixed slurry into a mold 18. Thus, for example, if the cure time of each mold from the time a mold receives a batch of mixed slurry to when the block is cured to a point where it can be safely handled is about ten minutes, and the mixing time of each batch is approximately one minute, then the number of molds per mixer for maximum efficient usage of the mixer and molds is ten. As such, when a first batch of blocks in the first mold reaches a point the resulting blocks can be safely handled, the blocks are removed from the first mold and a new batch of slurry is poured into the first mold. Each of the batches in the other nine molds should then be sufficiently cured in the sequence filled in order to remove the blocks from the molds. It is also contemplated that more than one mixing device may be employed for simultaneously mixing of multiple batches.

Figure 2:
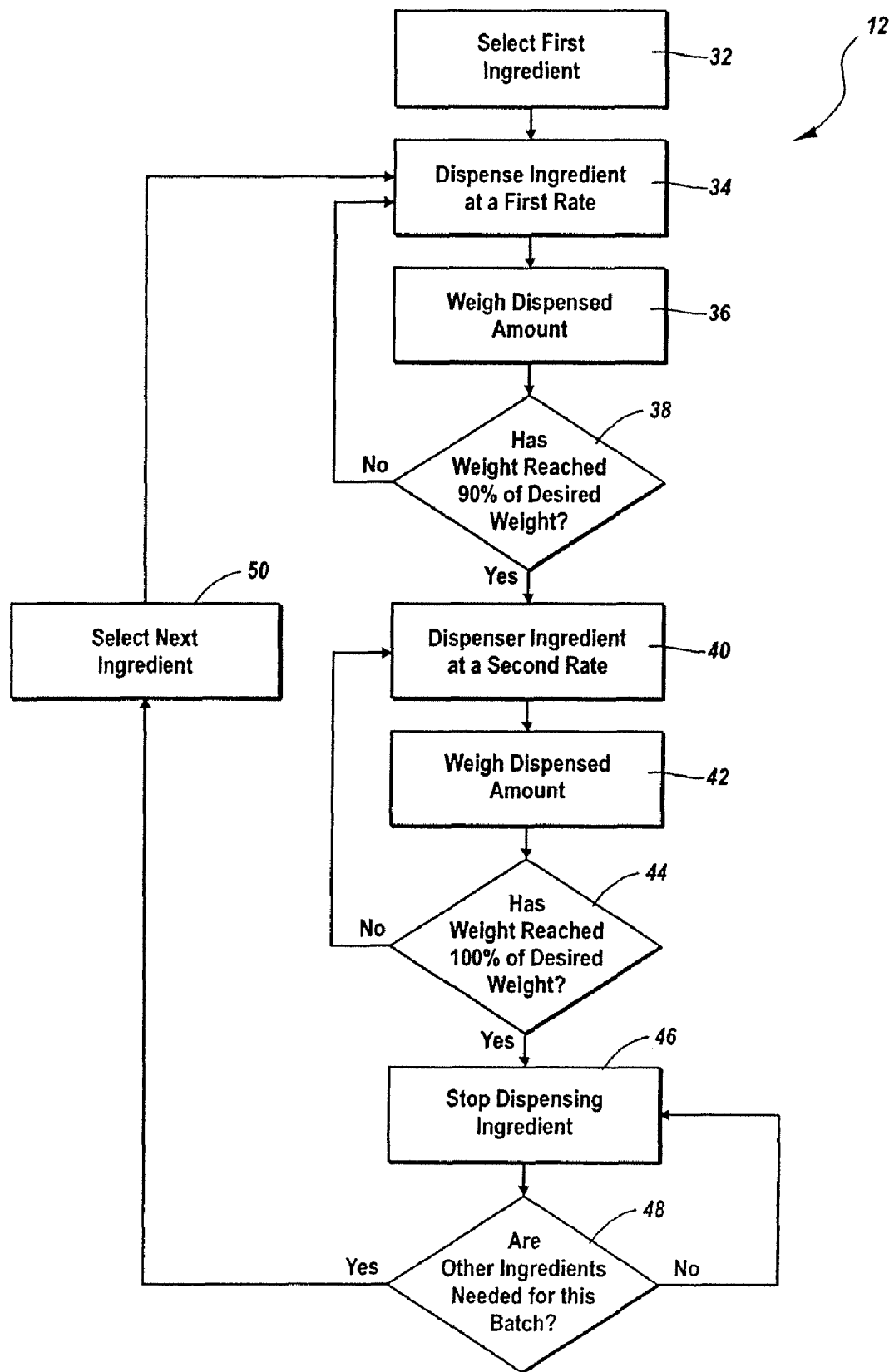
FIG. 2 is a schematic block flow diagram illustrating a preferred embodiment of a process for measuring ingredients for forming lightweight concrete building units in accordance with the principles of the present invention.

Referring now to FIG. 2, the method or process for measuring ingredients, generally indicated at 12, is comprised of several steps for substantially controlling the amount of each ingredient in each batch. Because the densities of most dry materials are relatively consistent, the quantity or volume of a material can be generally determined from the weight. The present process utilizes ingredient weights in a novel manner to meter the quantity of each ingredient in each batch. The first step involves selecting 32 the first ingredient to be added to the mixture that will form the desired cementitious slurry. The first ingredient is then dispensed 34 at a first rate onto a scale. It should be noted that the term "scale" refers to any device that is capable of receiving a material and determining its weight. The first ingredient is weighed 36 as the ingredient is dispensed 34. When the weight of the ingredient has reached 38 an amount proximate to but not in excess of the desired weight, for example 90% of the desired weight, the rate of dispensing 40 is decreased to a second slower rate so that the scale can more accurately respond to increased weight. The ingredient is further dispensed at this second slower rate while being weighed 42 until the weight has reached 44 approximately 100% of the desired weight. By using such a method, ingredients can be dispensed in more accurate quantities without significantly decreasing overall dispensing time. In the alternative, weighing ingredients while being dispensed at a single rate must either be dispensed at a slower rate to allow the scale to accurately measure changes in weight or likely result in inaccurately measured quantities if the rate of dispensing is too high. That is, it is difficult to control the quantity of ingredients resulting from dispensing at a single fast rate and then abruptly stopping the dispensing process when the desired weight is measured.

When the weight of the dispensed ingredient reaches 44 approximately 100% of the desired weight, dispensing is stopped 46 and it is determined 48 whether other ingredients are needed for the present batch. If not, no additional ingredients are dispensed for the batch. If so, the next ingredient is selected 50 and the measuring process 12 is repeated for the next ingredient. Multiple ingredients can be measured in this manner as the weight of the next ingredient is determined by calculating the weight added to the previously measured ingredients. This process is typically employed for measuring "dry" ingredients but may also be utilized for water, foaming agent and other liquid ingredients.

Preferably, a metered amount of water is added to the mixer before any of the dry ingredients so that the mixer can be activated with the water present to rinse the inside of the mixer between batches. The amount of water and foaming agent added to each batch are preferably measured by dispensing these "wet" ingredients for preselected periods of time. By knowing the size of the orifice through which the wet ingredients pass into the mixer and the pressure at which the wet ingredients are injected, relatively precise amounts of liquid ingredients can be dispensed by controlling the dispensing time.

In order to decrease the cure time of the resulting block (i.e., the time to reach a "green" state where the block is sufficiently rigid to be safely removed from the mold and handled), the process is performed at an elevated temperature. Preferably, this temperature is between 100 and 180 degrees Fahrenheit, which decreases the curing time of the cementitious slurry without significantly affecting its physical properties. Lower temperatures, even ambient temperatures, may be employed with the present invention, but will increase the overall cure time of the cement. Likewise, higher temperatures up to and exceeding the boiling point of water may also be employed to decrease the cure time. Decreasing the cure time of the cement to a "green" state is important in order to properly capture the entrained air in the cementitious slurry while the entrained air is substantially evenly dispersed throughout the slurry mixture. One problem found in the art is that the density of similar blocks vary within each block or from block to block because the entrained air was allowed to migrate or rise to the top (i.e., the heavier particles settled toward the bottom) before the block sufficiently solidified. In accordance with the present invention, the ability to reach this "green" state before the individual air cells coalesce or migrate maintains the "closed-cell" characteristics of the resulting block and produces building units with consistent densities of materials throughout the building unit. Maintaining the air cells in a closed form is important to give the blocks desired insulative, structural, and water resistant properties that would not otherwise be achieved if the individual air cells were allowed to join with other adjacent air cells to form larger air cells to any appreciable extent. For example, aerated concrete materials known in the art that are in an open cell form will allow air, heat, and water to travel into and through the material much more rapidly than similar materials having closed cells. A good analogy is to compare the difference between neoprene (a closed cell material) which is use for wet suits and a synthetic sponge (an open cell material). Both are made from similar materials but they perform quite differently.

The resulting blocks manufactured in accordance with the present invention are capable of withstanding a "freeze thaw test." Such tests are often required for certification of building materials for certain applications. The freeze thaw test requires the building material to be submersed in water for a period of time and then placed in a freezing environment for another period of time. If water has been allowed to absorb into the material, the water therein will expand when frozen causing fractures in the material. To date, there are no lightweight concrete products known other than the block manufactured in accordance with the present invention that can sufficiently pass the freeze thaw test, that have a relatively high volume of air.

Figure 3:
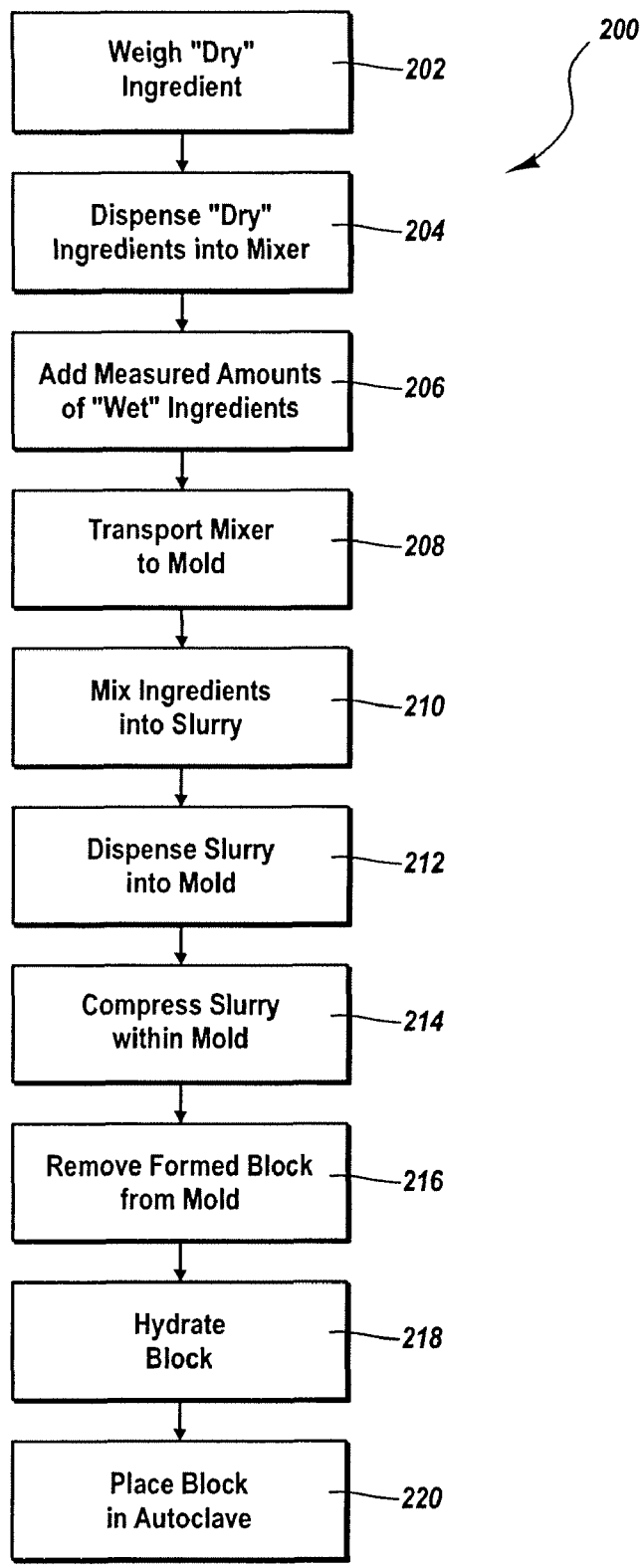
FIG. 3 is a schematic block flow diagram illustrating a second preferred embodiment of a process for forming lightweight concrete building units in accordance with the principles of the present invention.

Referring now to FIG. 3, the process, generally indicated at 200, in accordance with the present invention is illustrated. In the process 200, it is preferable that cement, sand, water, and foam are utilized to form the desired cementitious slurry. Fibers, additional cements, and other aggregates may also be included in accordance with the principles of the present invention depending on the desired characteristics of the finished product. The "dry" ingredients, such as cement and sand are weighed 202 to a desired weight and dispensed 204 into a mixer. Water and foam, generated by blowing or mixing air into a foaming agent to produce a foam having a consistency similar to shaving cream with larger or smaller air cells as may be desired, are added 206 to the mixture and mixed 210 with the other ingredients for a relatively short period of time (e.g., thirty seconds), sufficient to substantially evenly disperse the foam throughout the mixture. While the ingredients are being mixed 210, the mixer itself is transported 208 to the mold, thus utilizing the mixing time to convey the slurry to the desired mold. Of course, those skilled in the art will appreciate that a separate transport device may be utilized in which the mixer remains stationary, dispenses a mixed batch into a transport container and allows the transport container to deliver the batch of slurry to the mold. The present embodiment, however, keeps the cementitious slurry workable (i.e., in a liquid state) until it is dispensed into the mold such that the slurry is less likely to begin substantial solidification during the delivery or transport 208 process.

Preferably, the size of air cells within the foam are relatively consistent in size for producing cells within the slurry and core of the resulting block of relatively consistent sizes. The foam is formed from a foaming agent, such as a protein-based, synthetic, or a combination protein-based/synthetic foaming agent known in the art, having properties that will result in a foam that will maintain a stable foam at elevated temperatures. Additionally, the foaming agent is selected that will break down, when foamed, at a known temperature or approximately a known temperature. To form the cementitious slurry in accordance with the present invention, heated water, preferably at approximately 100 degrees Fahrenheit is mixed with the dry ingredients. The foaming agent is then added to the mixture at a temperature preferably below about 90 degrees Fahrenheit for a foaming agent that will foam at temperatures up to 100 degrees Fahrenheit. Such a foam preferably has the ability to remain stable (i.e., maintains surface tension of the air cells therein without collapsing) to at least a temperature of 120 degrees Fahrenheit.

As used herein, the surface tension of a bubble in a cementitious slurry at ambient pressure at sea level (the slurry having a selected temperature, a selected composition and components, and having a certain viscosity sufficient to resist migration of the air cells), is the ability of the bubble to resist coalescing and/or collapsing. As is known in the art, there are foaming agents which produce bubbles that are more resistant to collapse and coalescing either in the presence of certain surfactants or when heat, vibration, or other means are applied to the slurry to cause bubbles to collapse or coalesce with other adjacent bubbles to form new larger bubbles. The present invention preferably utilizes a temperature sensitive foaming agent that results in a foam whose bubbles have relatively high surface tension and thus remain stable and are less likely to coalesce or collapse, unless subjected to temperatures above the critical temperature of the foam (i.e., the temperature at which the foam breaks down). Those skilled in the art, however, will appreciate that various aspects of the present invention may be practiced with other types of aerated or lightweight slurries that may be formed by insitu chemical reaction or by adding lightweight aggregate materials, such as polystyrene pellets, to the mixture.

As previously discussed, it is preferable that as the slurry is being mixed 210, the slurry is simultaneously being transported 208 to a mold for delivery of the slurry. The slurry is then dispensed 212 from the mixer into a mold. Preferably, the heated slurry is poured into a mold that has been heated to an elevated temperature of approximately 180-220 degrees Fahrenheit. The heat from the mold and the fact that the slurry itself has been heated by the addition of heated water and foam hastens hardening of the slurry to limit the amount of coalescing of adjacent air cells within the slurry and to limit the amount of migration of air cells and settling of heavier particles to the bottom of the mold during the curing process. The elevated temperature of the slurry and mold quickly reduces the viscosity of the slurry to a point below which the air bubbles in the slurry can move or coalesce to form larger bubbles. Indeed, in accordance with the present invention, the heated ingredients utilized to form the cementitious slurry nearly immediately begin to cure much more rapidly. That is, because the slurry is heated by the combination of the dry ingredients with heated water and foam that are each at a temperature of over about at least 80 degrees Fahrenheit, the mixing and de-livery of the slurry to the mold is essentially a race against the curing process. Those skilled in the art, after understanding the principles of the pre-sent invention, will appreciate that other temperatures of components and ingredient ratios may be employed de-pending upon the types of cement and foaming agent used as well as the desired curing time of the slurry into a solid state. For example, by modifying the cement ratios, such as decreasing the quick setting cement or calcium aluminate cement by 25% and adding 25% more standard cement, the cure time would increase by about 10 minutes compared to other embodiments discussed herein. Likewise, reducing the temperature of the water added to the mixture by 25 degrees Fahrenheit, the cure time would increase by about seven minutes compared to adding water at 140 degrees Fahrenheit.

Heating the mold to a temperature above the critical temperature of the foam produces an outer wall or shell in each block. This shell is produced because the foam breaks down (i.e., the air cells collapses) in the layer adjacent the mold that exceeds the critical temperature of the foam before the slurry in this outer layer cures. One consequence of the heated mold is the formation of larger air cells adjacent the outer layer. The air cells in this region may not reach a hot enough temperature before curing of the cement to break down but may coalesce to form a small layer of larger air cells between the outer layer and the core of the block.

Modifying the temperature of the mold will affect the thickness of the outer wall of each block. For example, fore each 10 degree increase of the mold temperature above 180 degrees Fahrenheit the thickness of the outer wall will increase by about $1/16$ inch. Increasing the mold temperature above 180 degrees Fahrenheit to a temperature of 220 degrees, for example, also helps to produce a smoother outer surface on the block. For every decrease of 10 degrees Fahrenheit of the mold temperature, the wall thickness will decrease by about $1/32$ inch down to a temperature of about 150 degrees Fahrenheit.

In accordance with the present invention, a mold is utilized to compress 214 the slurry therein to a precise dimension. Preferably, the step of compressing 214 the lightweight slurry is performed to a substantially precise degree, that degree being substantially the same for each block produced. Compressing 214 the slurry is possible in accordance with the present invention, because the slurry is a lightweight slurry preferably filled with air cells that can be forced out of or compressed within the slurry depending on the amount of compression applied. As such, when the slurry is poured into a mold, the mold is capable of squeezing the slurry a precise amount to a specific dimension. This compressing 214 performs at least two functions. First, the compressing 214 causes air cells in an outer layer of the slurry to collapse such that the density of this outer layer increases to produce a relatively hard outer shell in the finished block. Second, the compressing 214 provides a means by which the dimensions of the resulting block can be precisely controlled. That is, regardless of the quantity of slurry poured into the mold or the beginning density of the slurry prior to being poured into the mold and assuming that the batch of slurry has an adequate amount of air cells entrained therein, the slurry can be compressed to a point where the air entrained within the slurry is removed to allow the desired amount of compression. Accordingly, each produced block will have nearly the same dimensions since each batch of slurry is compressed the same amount regardless of initial density or quantity of each batch of slurry (i.e., the compression is not dependent upon force but rather compressing to a specific dimension wherein a preselected volume within the mold is achieved). As such, each lightweight concrete building unit produced has a substantially precise volume and precise dimensions. Indeed blocks produced in accordance with the principles of the present invention can achieve dimensional tolerances of +/−0.03 inches or less.

Upon curing of the slurry into a block that is rigid enough to be handled, the blocks are removed 216 from the mold and hydrated 218 with water. That is, when the blocks reach a "green" state, the blocks are removed 216 the mold and transported for hydration 218, if necessary, during which water is sprayed or otherwise applied to the block. As is known in the art, this supplemental water facilitates the slow curing of the block and provides adequate water to complete the hydration process. The blocks may then be placed 220 in an autoclave to further aid the curing process of the blocks. The blocks may then be stacked, packaged and allowed to completely cure prior to shipment.

Figure 4:
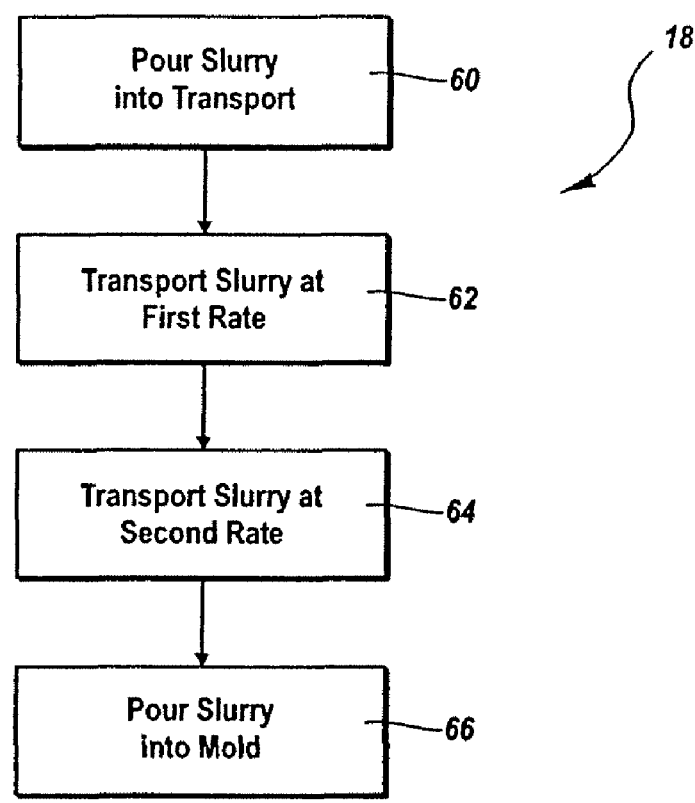
FIG. 4 is a schematic block flow diagram illustrating a preferred embodiment of a process for transporting mixed slurry to a mold in accordance with the principles of the present invention.

As illustrated in FIG. 4, the process of pouring 18 the mixed slurry into a mold, as shown in FIG. 1, may include the steps of pouring 60 the slurry into a transport container and transporting 62 and 64 the slurry to the mold while a new batch of slurry is being mixed 16 (see FIG. 1). The transport container may agitate the slurry during transport to keep the slurry in a workable state. The transport container then pours 66 the slurry into the mold and returns to the mixer for receiving another batch of slurry for another mold. Use of such a transport allows the mixer to continue to mix additional batches of slurry while other batches are being delivered to a mold. Of course, those skilled in the art will appreciate that multiple transports could be employed in accordance with the present invention. In order to increase the speed of transport, however, while maintaining precision of movement relative to each mold, the transport container containing a batch of slurry is accelerated to a first rate 62 or speed until the transport nears or is a relatively short distance from the mold. The transport is then decelerated to a second slower rate 64 or speed until the transport is properly positioned over the mold for pouring 66 the slurry into the mold. As such, the transport can move the slurry quickly to each mold without sacrificing precision of position over the mold.

Figure 5:
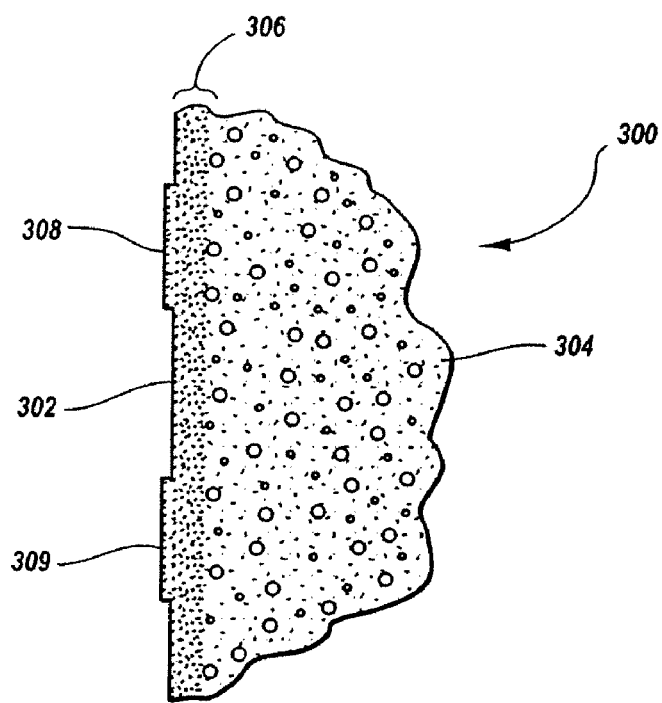
FIG. 5 is a partial cross-sectional view of a lightweight building unit manufactured in accordance with the principles of the present invention.

As shown in FIG. 5, a lightweight cement block, generally indicated at 300, having a "closed cell" structure manufactured in accordance with the present invention, has a novel internal structural configuration. More specifically, the block 300 has a relatively smooth, dense, continuous outer surface 302 and a lightweight inner core 304. This outer surface 302 is preferably produced by at least two process parameters. First, the foaming agent contained in the outer surface 302 of the slurry that contacts a heated mold quickly destabilizes causing the air cells to collapse producing a layer of slurry with fewer air cells. Second, compression of the slurry within a mold further causes air cells in an outer layer being compressed to collapse and forces the air cells out of the slurry. This outer surface or shell 302 gives the block 300 unique characteristics. Preferably, the relatively smooth outer surface 302 is a result of an outer, dense layer 306 having a width of about 1/64 inch to 1 inch, but could be larger or smaller in width depending on process parameters. The outer layer 306 gives the block 300 unique properties including the ability to resist the absorption of water by capillary action to an appreciable extent, as is required by the "freeze thaw" test, impact resistance to external forces that would otherwise damage the block 300, better insulative values (i.e., "R" value). In addition, the structural strength of the block 300 is dramatically increased since the outer layer 306 creates a hardened outer framework to support the softer, less dense core 304. In fact, the block 300 can have a core 304 that has a higher volumetric percentage of aeration compared to aerated concrete blocks in the art because the outer layer 306 provides the necessary structural support for the aerated core 304. Thus, the block 300 can be made lighter and use less cement per block than any other block known in the art.

Figure 6:
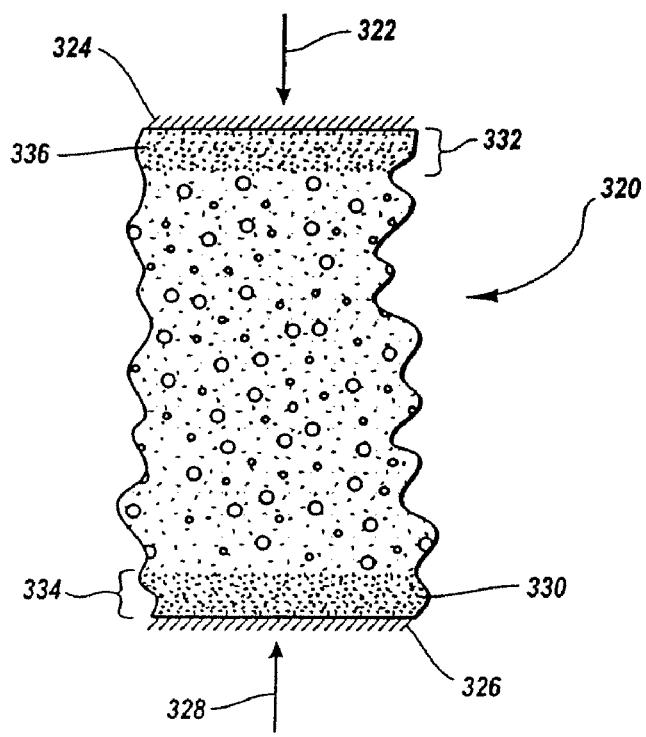
FIG. 6 is a partial cross-sectional view of cementitious slurry being compressed within a mold in accordance with the principles of the present invention.

As further illustrated in FIG. 6, in accordance with the present invention, when the slurry, generally indicated at 320, is placed inside a mold, indicated by surfaces 324 and 326, and compressed, as indicated by arrow 322, the surface 326 presses, as indicated by arrow 328, against the bottom 330 of the slurry 320. The slurry 320 is thus "squeezed" or compressed along this axial direction. As a result, air cells are forced from the slurry 320 and layers 332 and 334 of denser material are formed along the top 336 and bottom 330, respectively, of the slurry 320. Typically, these layers 332 and 334 are of approximately equal thickness as a result of the compression. Depending on the density of the slurry 320 during compression, however, the layers 332 and 334 may have different thicknesses. In either case, the resulting block has relatively thick layers 332 and 334 at the surfaces where the block is typically stacked. That is, additional structural rigidity is provided in the block along the surfaces that are employed to stack the block, resulting in blocks and walls formed therefrom that have better structural properties than lightweight concrete blocks known in the art.

Referring again to FIG. 5, the foregoing compression techniques may be employed in accordance with the present invention to produce textures, designs, or other aesthetic textural features 308 and 309 in the outer surface 302 of the block 300. Thus, the slurry can be compressed against the surface 302 to imprint a texture on the surface 302 while the slurry is in the mold.

Figure 7:
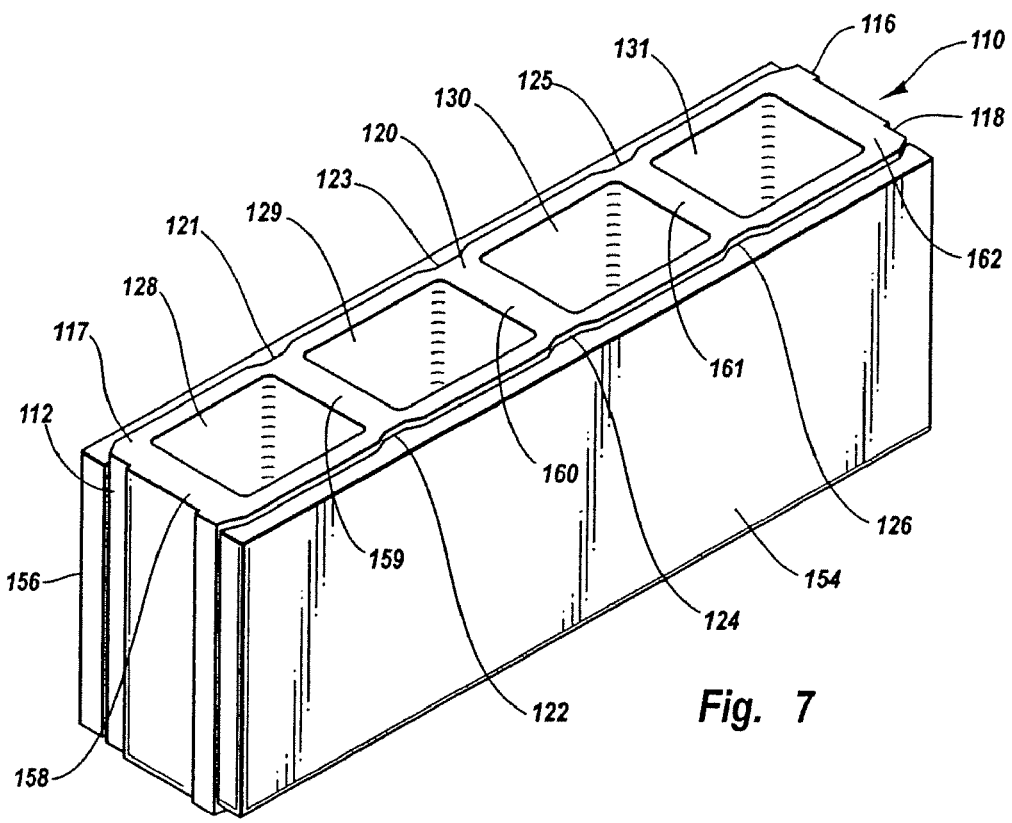
FIG. 7 is a perspective top view of a lightweight building unit manufactured in accordance with principles of the present invention.
Figure 8:
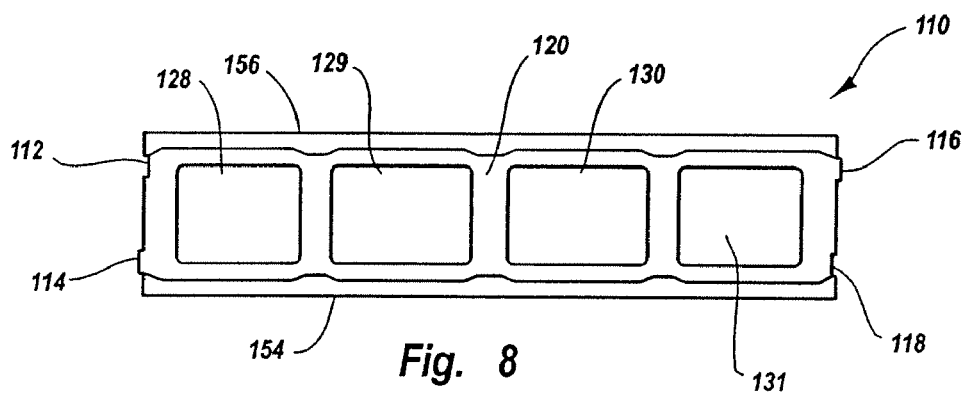
FIG. 8 is a top view of the building unit illustrated in FIG. 7.
Figure 9:
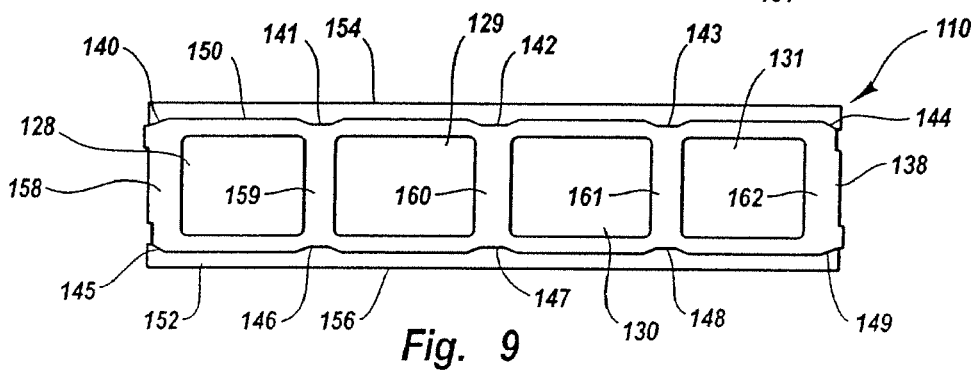
FIG. 9 is a bottom view of the building unit illustrated in FIG. 7.

The unique lightweight concrete building units of the present invention have external features for interlocking adjacent blocks to allow the blocks to be dry stacked without the need for mortar or other binding agents interposed between building units. Such a block is illustrated in FIGS. 7, 8 and 9 in which the block, generally referred to at 110, in accordance with the present invention has a generally rectangular configuration with interlocking or mating features 112, 114, 116, 118, 120, 121, 122, 123, 124, 125 and 126, among others, that provide the ability to stack the blocks 110 in an interlocking arrangement. FIG. 8 is a view of the top of the block 110 showing the various mating features, such as mating features 112 and 114 for interlocking with mating features 116 and 118, respectively of another block 110. These "tongue and groove" mating features 112, 114, 116 and 118 are preferably substantially vertically aligned relative to the block 110 such that the blocks 110 can be vertically removed, i.e., slid, from a mold during the manufacturing process. The bottom of the block 110, as shown in FIG. 9, also has mating features 140-149 which comprise an inverse impression of the top 120 of the block 110 for mating with features such as mating features 121-126. In addition, the bottom 138 of the block 110 is recessed below the elongate sides 150 and 152 to receive the raised top portion 117 of the block 110. The mating features 121-126 and 140-149 are preferably relatively evenly spaced so that when the blocks 110 are stacked, they can be offset or staggered from one another as one of skill in the art would typically build a brick wall. Thus, the mating features 140-149 can receive any of the mating features 121-126 of another block 110.

As is further illustrated in FIGS. 7, 8, and 9, each block 110 is defined by a pair of elongate sides 154 and 156 separated by a plurality of interposing walls 158, 159, 160, 161 and 162 with the walls 158 and 162 forming the ends of the block 110. The walls 158-162 define a plurality of transversely extending chambers or cavities 128, 129, 130, and 131 that significantly reduce the amount of cement required per block 110 compared to a solid block that does not have such cavities. In addition, these cavities provide a means for adding structural strength to a stacked arrangement of the blocks 110.

Figure 10:
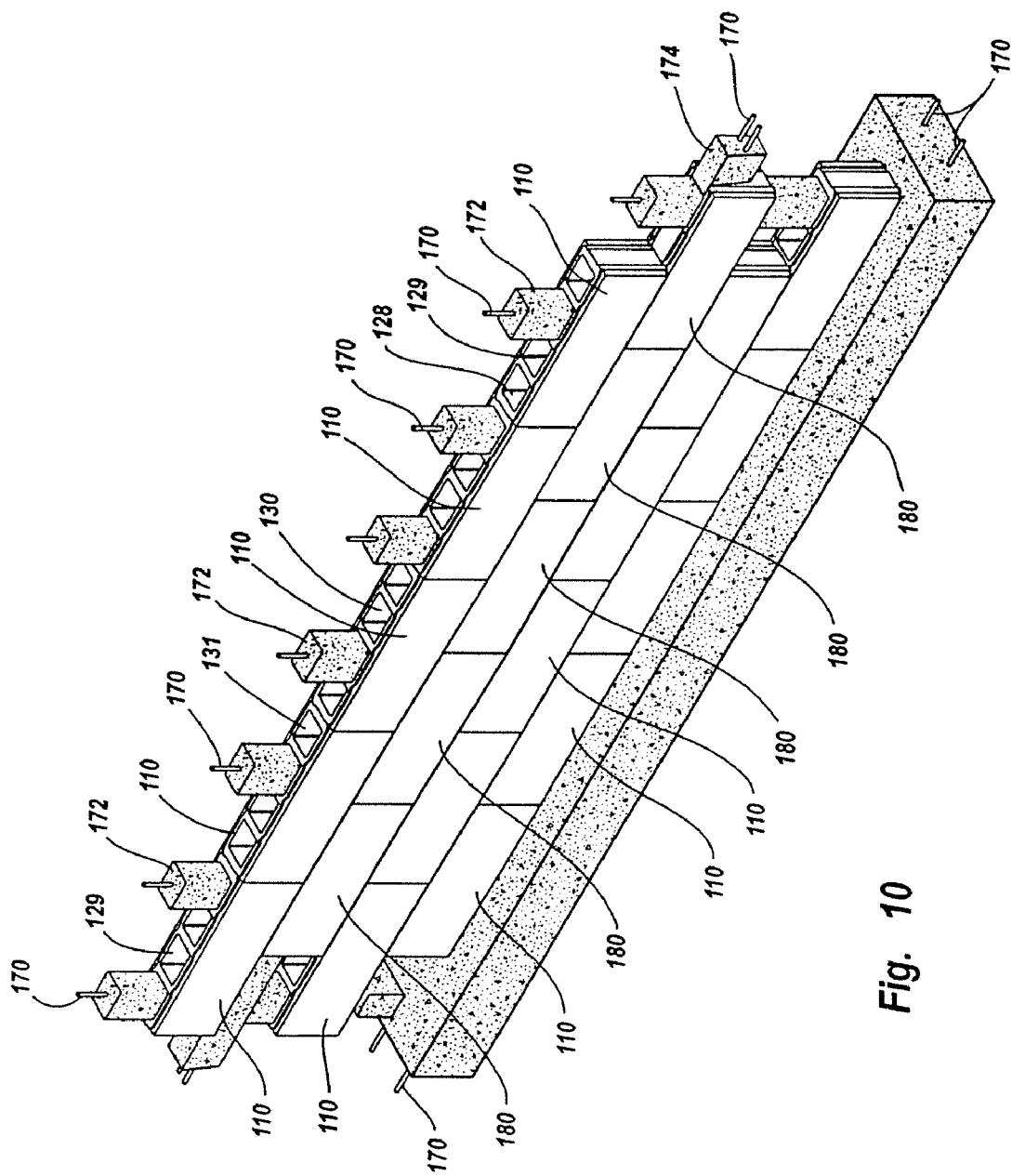
FIG. 10 is a perspective top view of a wall constructed with building units in accordance with the principles of the present invention.

As shown in FIG. 10, the blocks 110 in accordance with the present invention are stacked in a manner in which the mating features as described with reference to FIGS. 7, 8 and 9 properly align the stacked blocks 110 such that the cavities 128, 129, 130, and 131 align with cavities of other blocks 110 stacked above and below. Rebar 170 or other structural materials may be inserted into the cavities 128, 129, 130, and 131 and the cavities may be filled with non-aerated cement to provide columns 172 of rigid support within the blocks 110.

Figure 11:
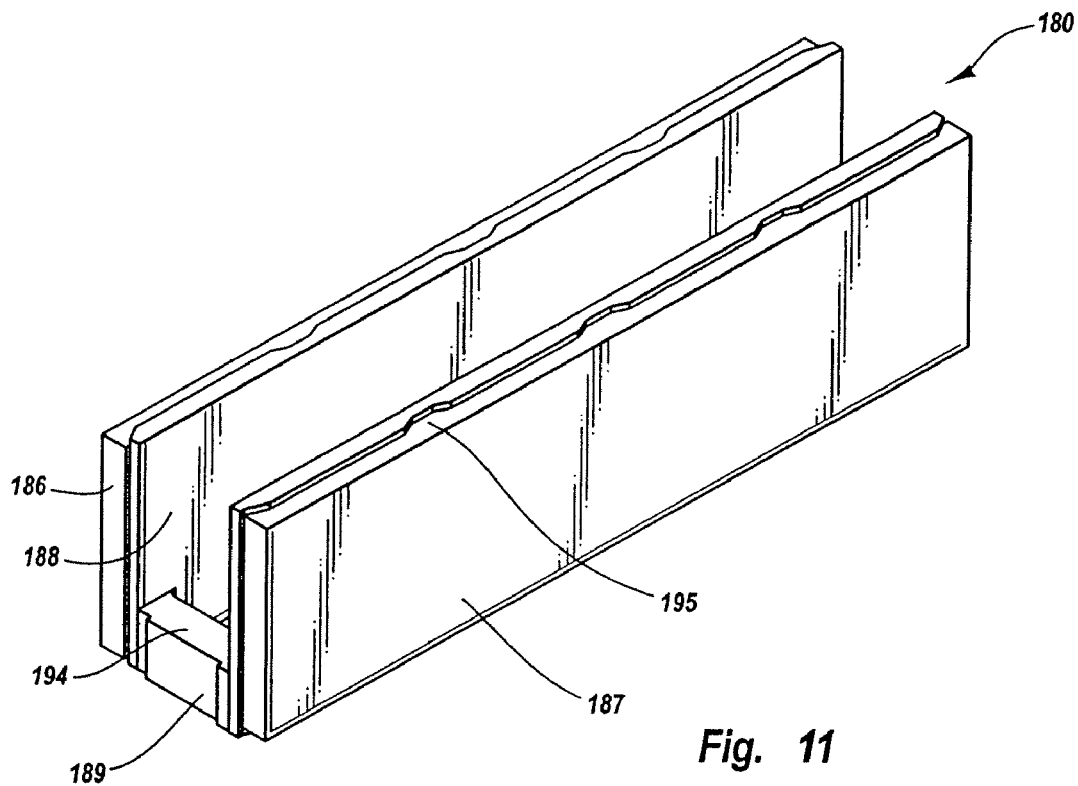
FIG. 11 is a perspective top view of a U-shaped building unit in accordance with the principles of the present invention.
Figure 12:
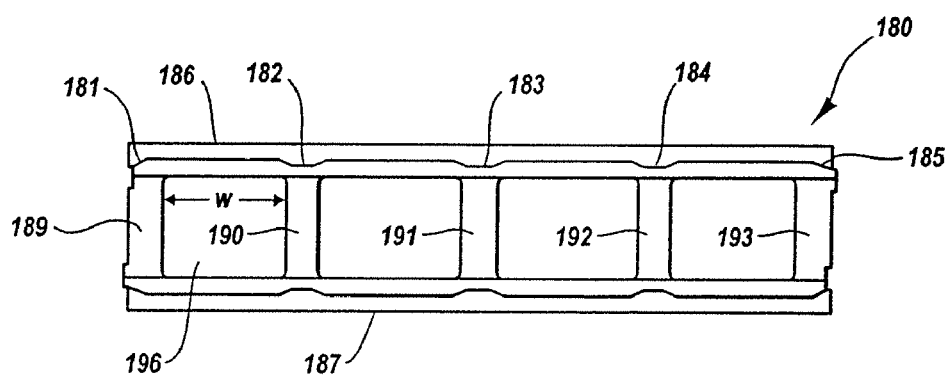
FIG. 12 is a top view of the building unit illustrated in FIG. 11.

U-shaped blocks, generally indicated at 180, as illustrated in FIGS. 11 and 12 may also be employed to allow rows 174 of horizontal support preferably comprising non-aerated concrete and rebar 170 (see FIG. 10) to extend through the wall of the structure being built with the block 110 of the present invention. The U-shaped block 180 includes mating or interlocking features 181-185 as well as other features similar to those found on the block 110 for mating with adjacent blocks above and below the U-shaped block 180. Such features (not shown) are provided on the bottom of the block 180 to mate with blocks 110 as well. The U-shaped block 180 is similar in overall size and shape to the blocks 110, but have side walls 186 and 187 that define a longitudinal channel 188 extending the length of the block 180. Furthermore, the dividing or interposing walls 189-193 are similar in configuration to similar walls found in the block 110 but are of a shorter height to further define the longitudinal channel 188. Preferably, the height of the channel 188 from the top edge 194 of the wall 189 to the top edge 195 of the wall 187 is approximately equal to the width W of one of the vertical chambers 196.

Figure 13:
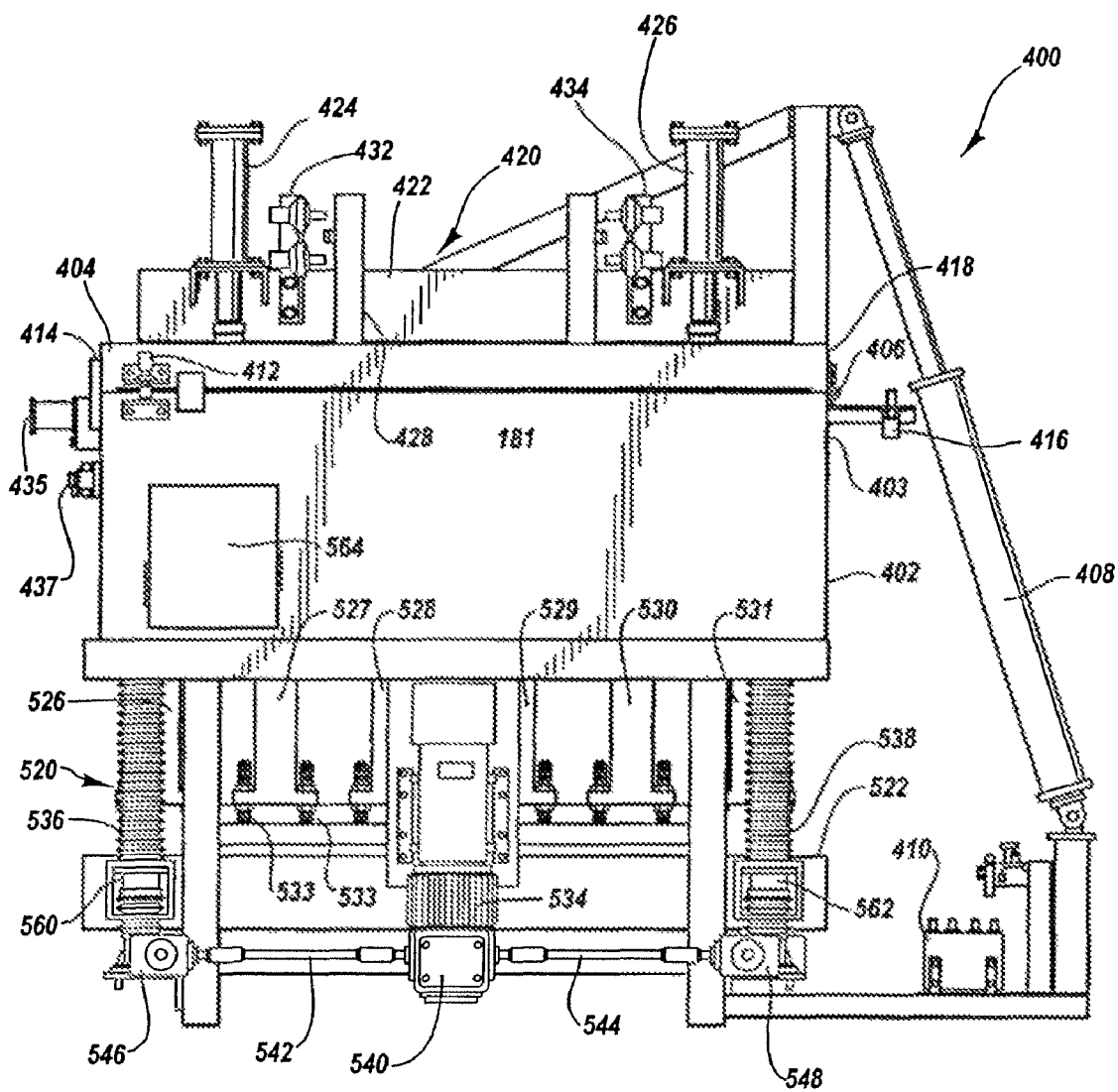
FIG. 13, is a side view of a mold in accordance with the principles of the present invention.

The building units as described are preferably formed in a mold, generally indicated at 400, in accordance with the principles of the present invention, shown in FIG. 13. The mold 400 includes a base portion 402 forming the sides of the mold 400 and a lid 404. The lid 404 is pivotally attached to the back side 403 of the base portion 402 as with hinges 406 to allow access to the inside of the mold 400. The use of hinges 406 and 407 provide for controlled positioning of the lid 404 relative to the rest of the mold 400 in a reliably repetitive manner. Of course, those skilled in the art will appreciate after understanding the principles of the present invention that other mechanisms may be employed to position the lid 404 relative to the rest of the mold 400. The lid 404 is pivotally actuated with actuator 408 preferably comprising a hydraulic ram controlled by hydraulic control valve 410. Sensor 412 is provided to detect when the lid 404 is in a closed position and is positioned near the proximal end 414 of the lid 404. Sensor 416 is also provided proximate the distal end 418 of the lid 404 to detect when the lid 404 is in an open position. The lid 404 supports a slurry compression system, generally indicated at 420 which is configured for precise compression of a slurry batch contained within the mold 400 to produce individual building units having substantially precise dimensions. The slurry compression system 420 includes an upper lifting bar 422 to which actuators 424 and 426, preferably hydraulic lifting rams are attached, guides 428 and 430 and sensors 432 and 434 for detecting top plate elevation.

A hold down device 435 is provided to lock the lid 404 to the base portion 402 of the mold 400 during the compression phase of the operation. Each hold down device 435 preferably comprises an air ram controlling a tapered hold down pin and an electronic sensor to determine whether the hold down pin is properly engaged. An air valve controller is provided to control actuation of the air ram.

Figure 14:
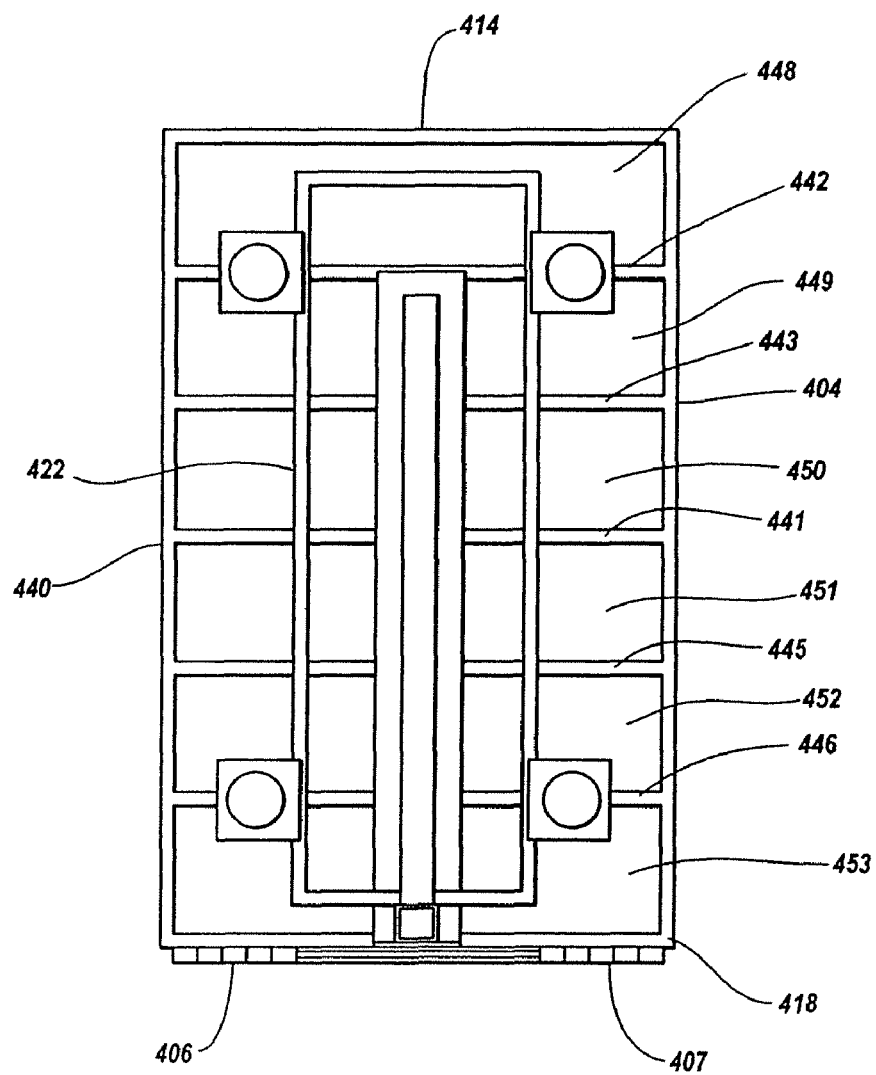
FIG. 14 is a top view of the lid of the mold illustrated in FIG. 13.

As shown in FIG. 14 the lid 404 comprises a frame having a first side 440, a second side 441, a distal end 418 and a proximal end 414. A plurality of cross-members 442-446 depend from and are interposed between the sides 440 and 441 of the lid 404. The cross-members 442-446 define a plurality of apertures 448-453 corresponding to chambers within the mold 400. Four actuators 424, 426, 436 and 438, preferably hydraulic or pneumatic rams, secured to lifter bar 422 that essentially forms a rectangular frame, raise and lower the lifter bar 422 to precisely control compression of the slurry contained within the mold 400.

Figure 15:
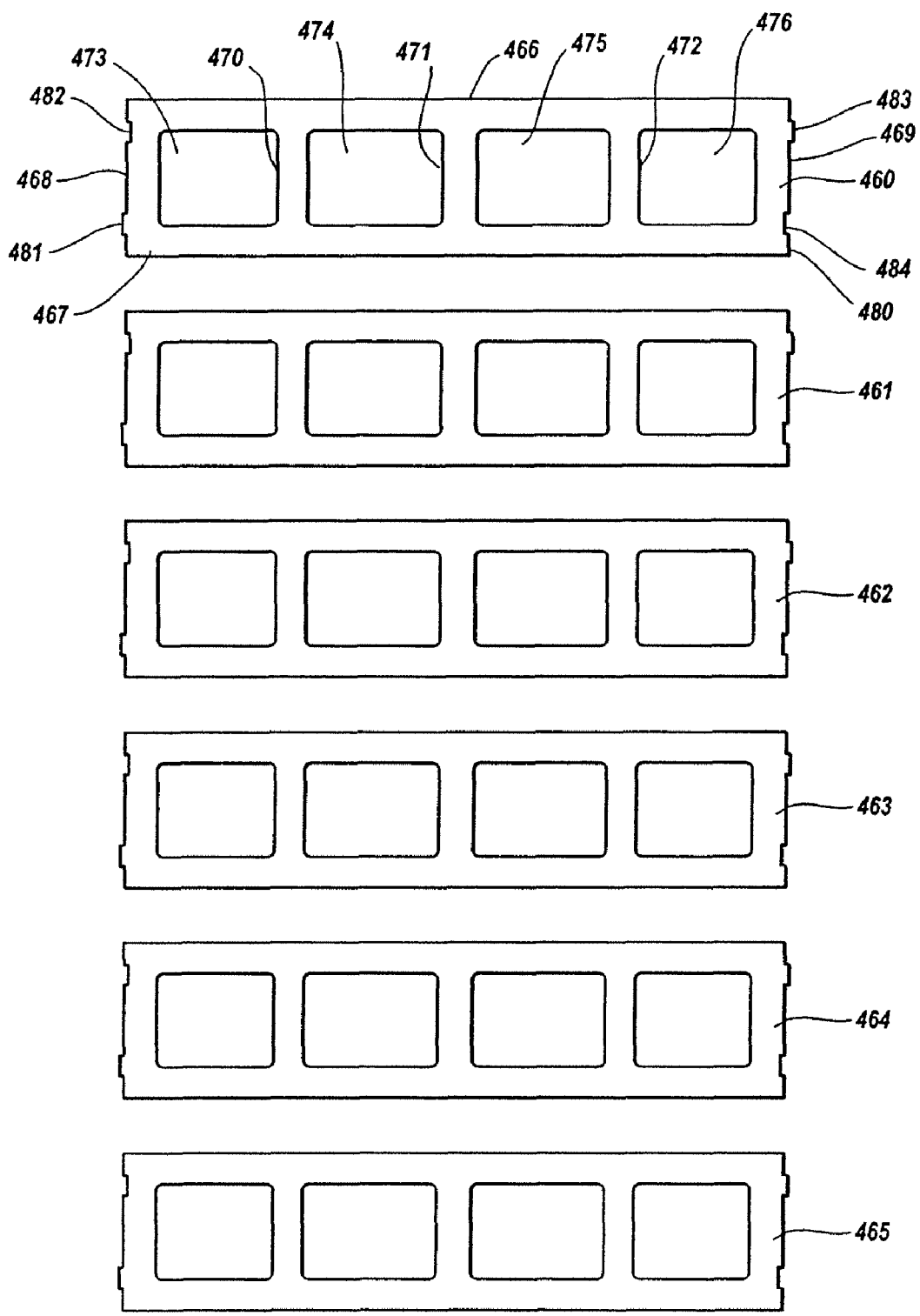
FIG. 15 is a top view of compression plates for the mold illustrated in FIG. 13 in accordance with the principles of the present invention.

Referring now to FIG. 15, a plurality of compression plates 460-465 are secured to the lifter bar 422 shown in FIG. 14. Each compression plate, such as plate 460, is configured to relatively closely fit within the individual chambers of the mold 400 but have enough clearance to allow relatively easy insertion and removal therefrom without becoming jammed within the mold 400. As such, the perimeter 480 of the plate 460 includes external features 481-484 to substantially match the contour of the inner surface of the mold 400 thus keeping any substantial amount of slurry from passing between the plate 460 and the inside surface of the mold 400 during the compression process. The plate 460 includes a first elongate side member 466 and a second opposing elongate side member 467, a first end 468 and a second end 469 interposed between and depending from the sides 466 and 467 to essentially form a rectangular plate. A plurality of cross-members 470, 471 and 472 are interposed between and depend from the first and second side members 466 and 467 to define a plurality of apertures 473, 474, 475 and 476.

Figure 16:
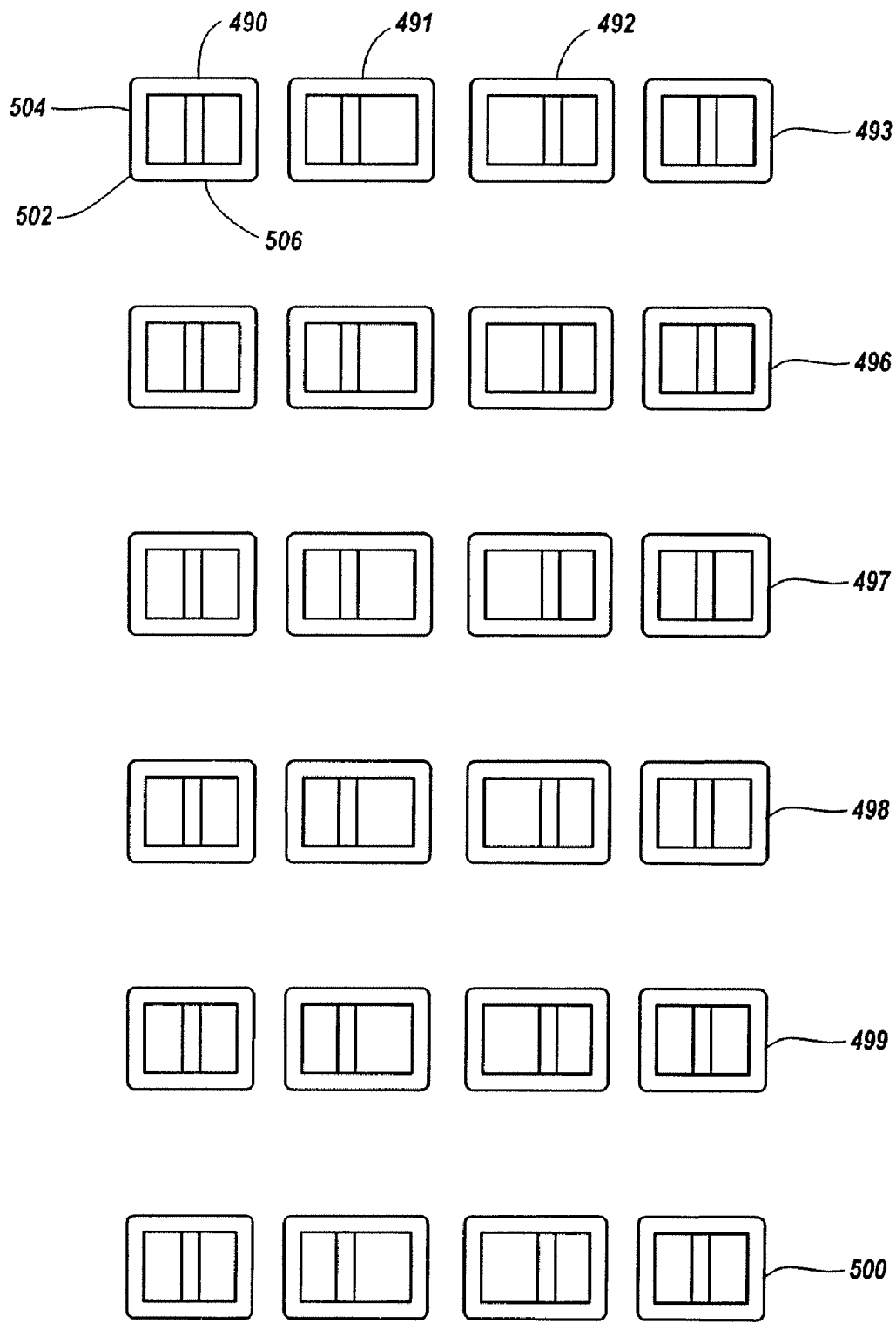
FIG. 16 is a top view of mold pillars for the mold illustrated in FIG. 13 in accordance with the principles of the present invention.

As further shown in FIG. 16, the apertures 473-476 of the plate 460 are sized and shaped to fit over pillars 490-493 that are positioned inside the mold 400 for forming internal chambers inside the finished building units in accordance with the present invention. The other pillars, such as pillars 496-500, are similarly positioned relative to the other plates 461-465. Each pillar, such as pillar 490 is generally rectangular in shape, but may have other geometric configurations, and is preferably tapered from proximate its proximal end 502 to proximate its distal end 504. This taper 506 allows for easier vertical removal of the building units such that as a building unit is lifted from the pillars 490-493, the building unit will effectively disengage from contacting the pillars 490-493 after a relatively small lifting displacement of the building unit relative to the pillars 490-493. Such disengagement substantially prevents the building units from becoming damaged by rubbing against the pillars 490-493 during removal and reduces the possibility of jamming the building unit within the mold during removal.

Figure 17:
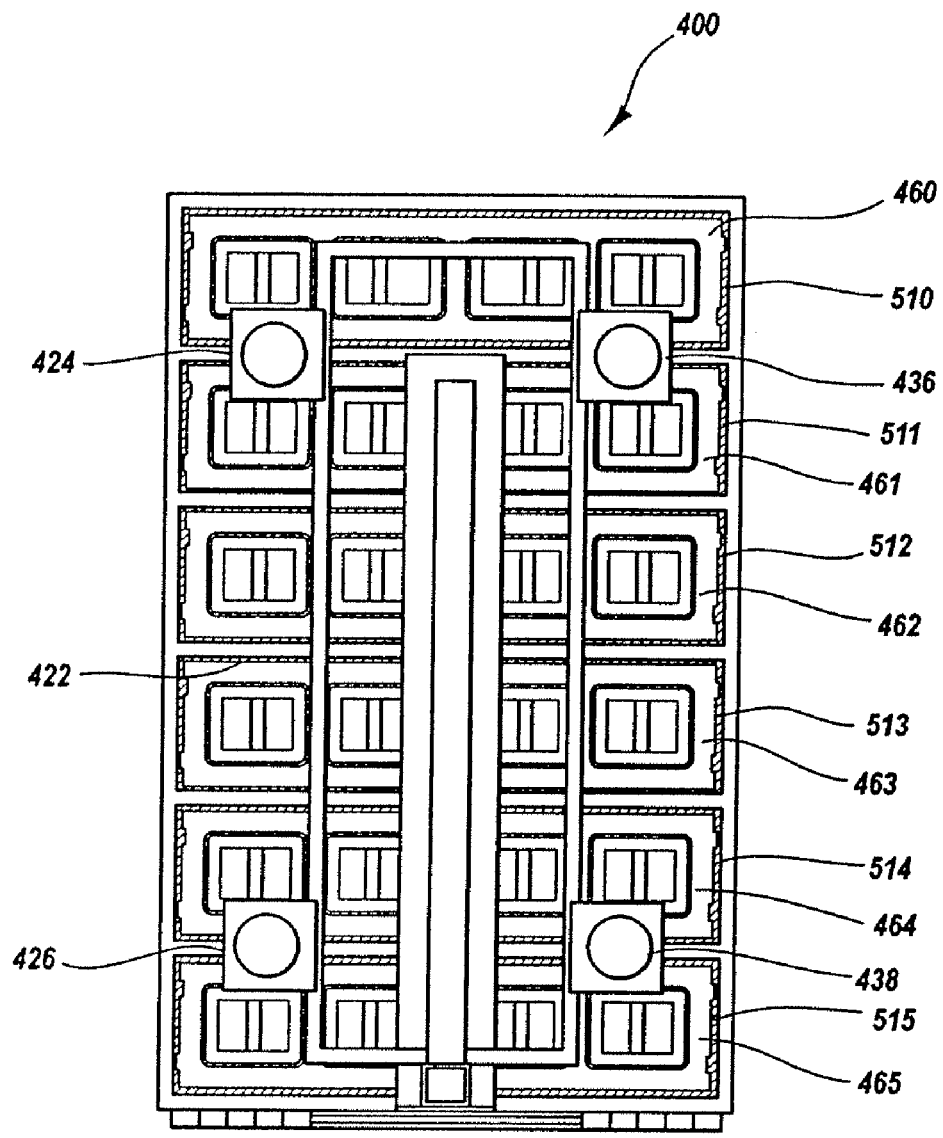
FIG. 17 is a top view of the mold illustrated in FIG. 13.

As further shown in FIG. 17, the plates 460-465 fit within cavities 510-515, respectively, of the mold 400 and can be raised and lowered within the cavities with the hydraulic rams or actuators 424, 426, 436 and 438 a precise amount to compress slurry contained within the mold 400. This precise movement of the plates creates a precise volume within each chamber or cavity 510-515 to produce building units with relatively precise outer dimensions (e.g., +/−0.03 inch). Producing such building units in accordance with the present invention that have such precise tolerances compared to other similar building units known in the art allows the building units to be dry stacked since there is little variance in wall height along a length of stacked building units for a given height wall.

Referring again to FIG. 13, the mold 400 also includes a block raising device, generally indicated at 520 for raising the at least partially cured building units from the mold 400. The lifting device 520 comprises a lower lifting bar 522 to which a plurality of lifting arms 526-531 are attached. The lifting arms 526-531 are secured to the lower lifting bar 522 with threaded rods 533 and thus may be adjusted relative to the lower lifting bar 522. As the lifting bar 522 is raised from a molding position, the lifting arms 526-531 move in unison to raise building units formed inside the mold 400 out of the mold for further processing. The lifting bar 522 may be raised and lowered with various devices known in the art including hydraulically or pneumatically driven actuators or, as is shown in FIG. 13, an electric motor 534 which is linked to ball screws 536 and 538. The motor 534 is coupled to a first gear box 540 which drives a pair of shafts 542 and 544. The shafts 542 and 544 are connected to a pair of right angle gear boxes 546 and 548, respectively.

Figure 18:
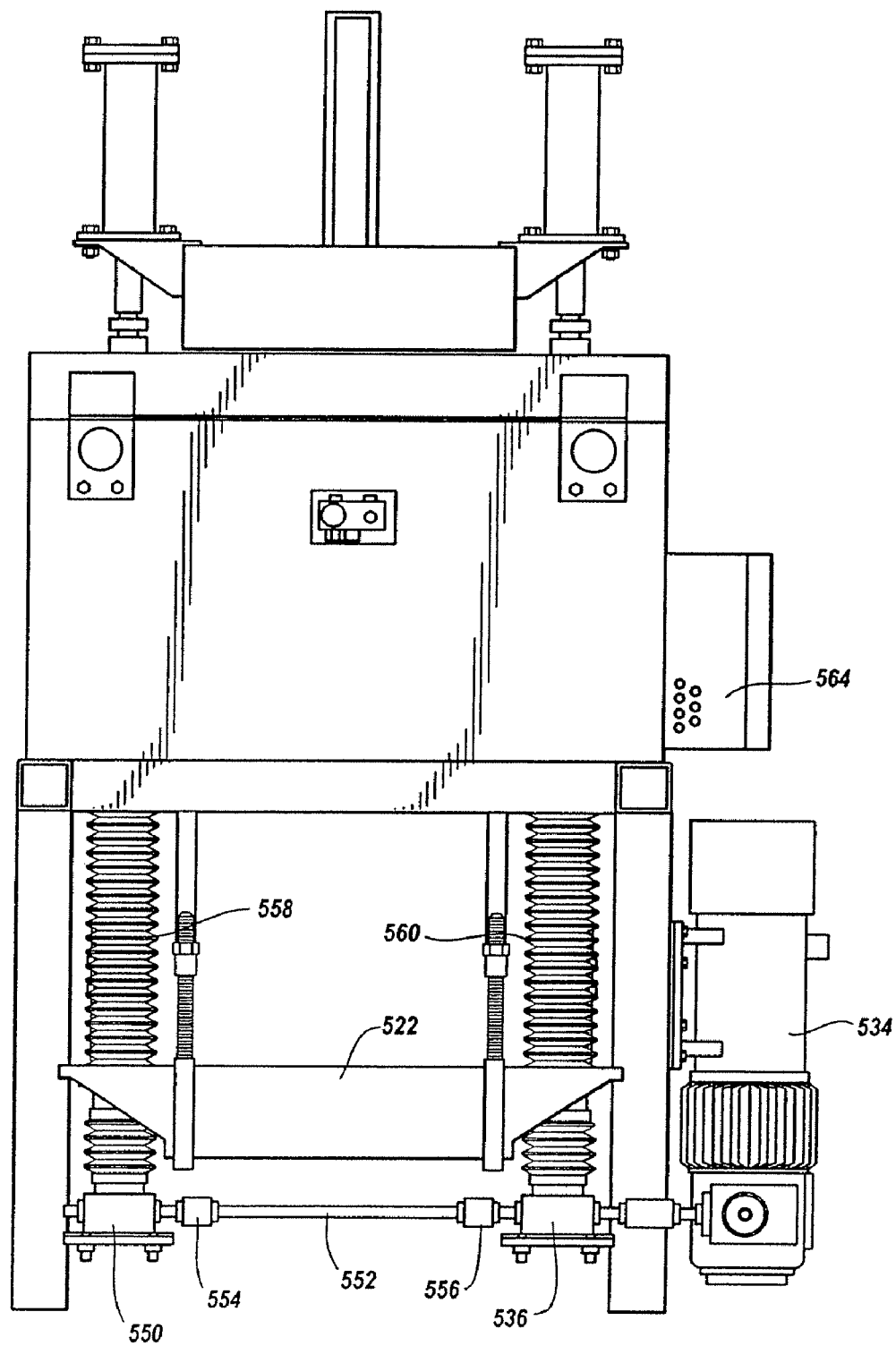
FIG. 18 is a front end view of the mold illustrated in FIG. 13.

As further shown in FIG. 18, the ball screws 536 and 550 are interconnected with shaft 552 and unions 554 and 556 so that the ball screws 536 and 550 are controlled and driven in unison to raise and lower the lower lifting bar 522. External boots 558 and 560 are provided over the ball screws contained therein to protect the threads from contamination that may otherwise hinder their performance. As the motor 534 causes rotation of the shafts 542, 544 and 552, the ball screws rotate relative to internally threaded collars 560 and 562 that are coupled to the lifter bar 522 causing the collars 560 and 562 to raise or lower the lower lift bar 522 depending on the direction of rotation of the ball screws. Because all four ball screws are controlled in unison by a single motor in a substantially symmetrical and uniform manner, the lifter bar 522 can be raised or lowered while staying in a level plane.

Control of the various components of the mold 400 are preferably computer controlled as with a PLC 564. Thus, each movement of the mold 400 can be precisely controlled and proceed in a preprogrammed and orderly manner. That is, in operation, the lid 404 of the mold 400 is in an open position to receive cementitious slurry therein. In addition, the lifter arms 526-531 have been lowered and the plates 460-465 have been raised. After receiving a batch of slurry, the lid 404 of the mold 400 is closed and locked in position, and the plates 460-465 are lowered into the mold to compress the slurry contained therein. After a few minutes when the slurry has cured to at least a "green" state whereby the now formed building units can be handled, the plates 460-465 are raised, and the lid 404 is opened. The lower lifter arms 526-531 are then raised to force the "green" blocks from the mold 400 for removal therefrom.

Figure 19:
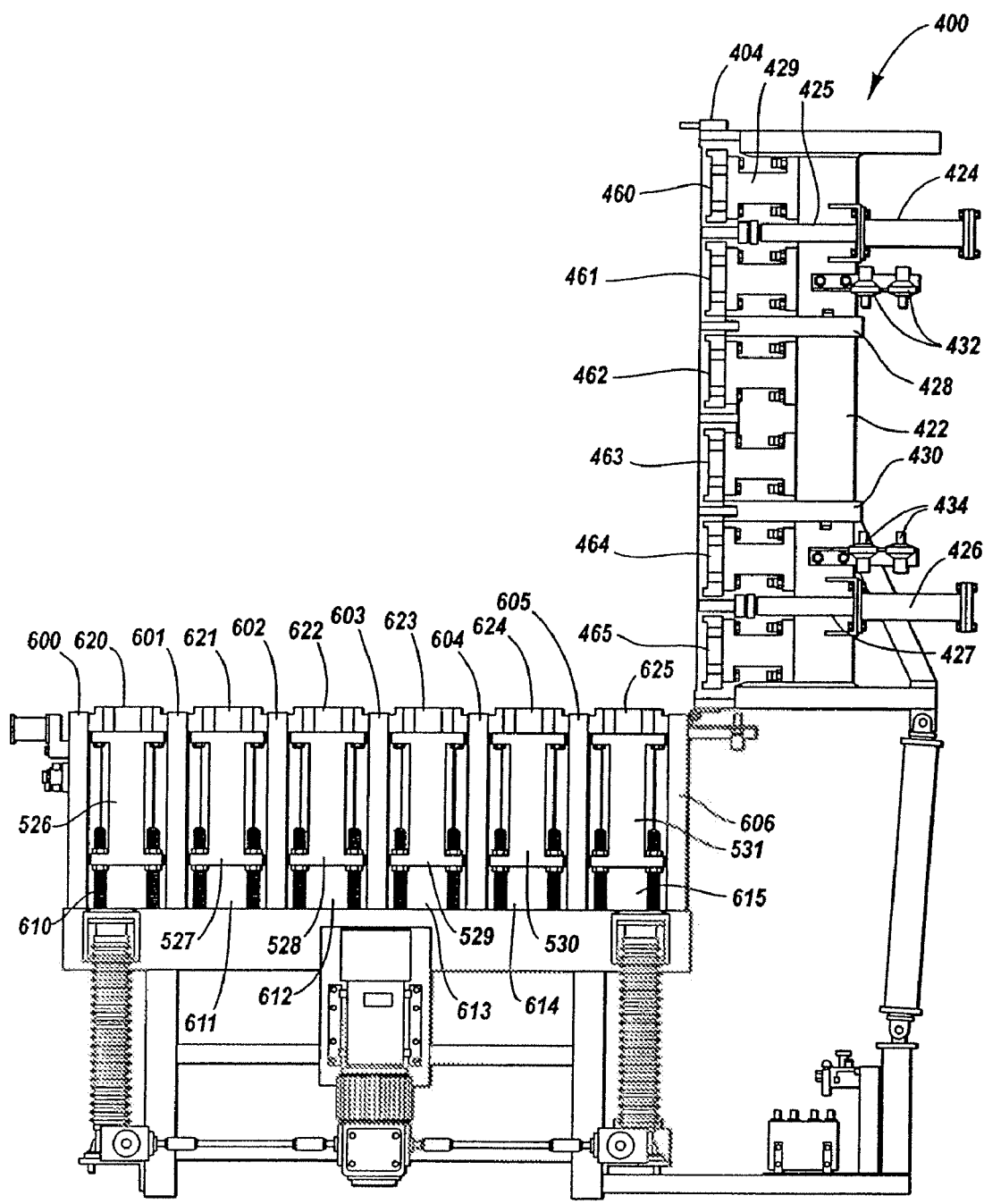
FIG. 19 is a side view of the mold illustrated in FIG. 13 in which the lid is in an opened position and the sides of the mold have been removed to show the inside of the mold.

Referring now to FIG. 19, the mold 400 is illustrated with its sides removed and in an open position. In addition, the lifting arms 526-531 are shown in a fully extended position (i.e., a position whereby the block can be removed from the mold 400). The mold 400 is comprised of a plurality of internal walls or panels 600-606, of which panels 600 and 606 form the proximal and distal ends, respectively, of the mold 400. The panels 600-606 form a plurality of internal chambers 610-615 within the mold for forming, in this example, six individual building units each time the mold 400 is filled with a slurry. Attached to the top of each arm 526-531 is a bottom mold plate 620-625 each of which fit relatively tightly within the chambers 610-615, respectively, while still allowing vertical movement of the plates 620-625 therein. Each plate 620-625 is configured to form the bottom of the building unit, such as that shown in FIG. 9. As such, the plates 620-625 include reverse impressions of the mating features of the block. In addition, as with the plates 460-465, the perimeter of each plate 620-625 is configured to match the configuration of the chambers 610-615 including the tongue and groove features. As such, the mold 400 is provided with upper actuable plate members 460-465 for compressing the slurry within the mold 400 and lower actuable plate members 620-625 for lifting the cured building units from the mold 400. Those skilled in the art, however, will appreciate that actuation of either or both sets of plates could be employed to compress the slurry contained therein to obtain the beneficial results of compression taught by the present invention.

As further illustrated in FIG. 19, the actuators 424 and 426 are provided with longitudinally extending shafts 425 and 427, respectively. The distal ends of the shafts 524 and 427 are attached to the lid 404 while the body of the actuators 424 and 426 is attached to the upper lifting bar. When the plates 460-465 are in a retracted position as is shown in FIG. 19, the shafts 425 and 427 are in an extended position. When the lid 404 of the mold 400 is in a closed position, retraction of the shafts 425 and 427 into the body of the actuators 424 and 426 cause the lifter bar 422 to lower and the upper lifting arms, such as arm 429, and plates 460-465 to extend into the mold cavities 610-615 until the sensors 432 and 434 detect the desired precise position of the guides 428 and 430.

Figure 20:
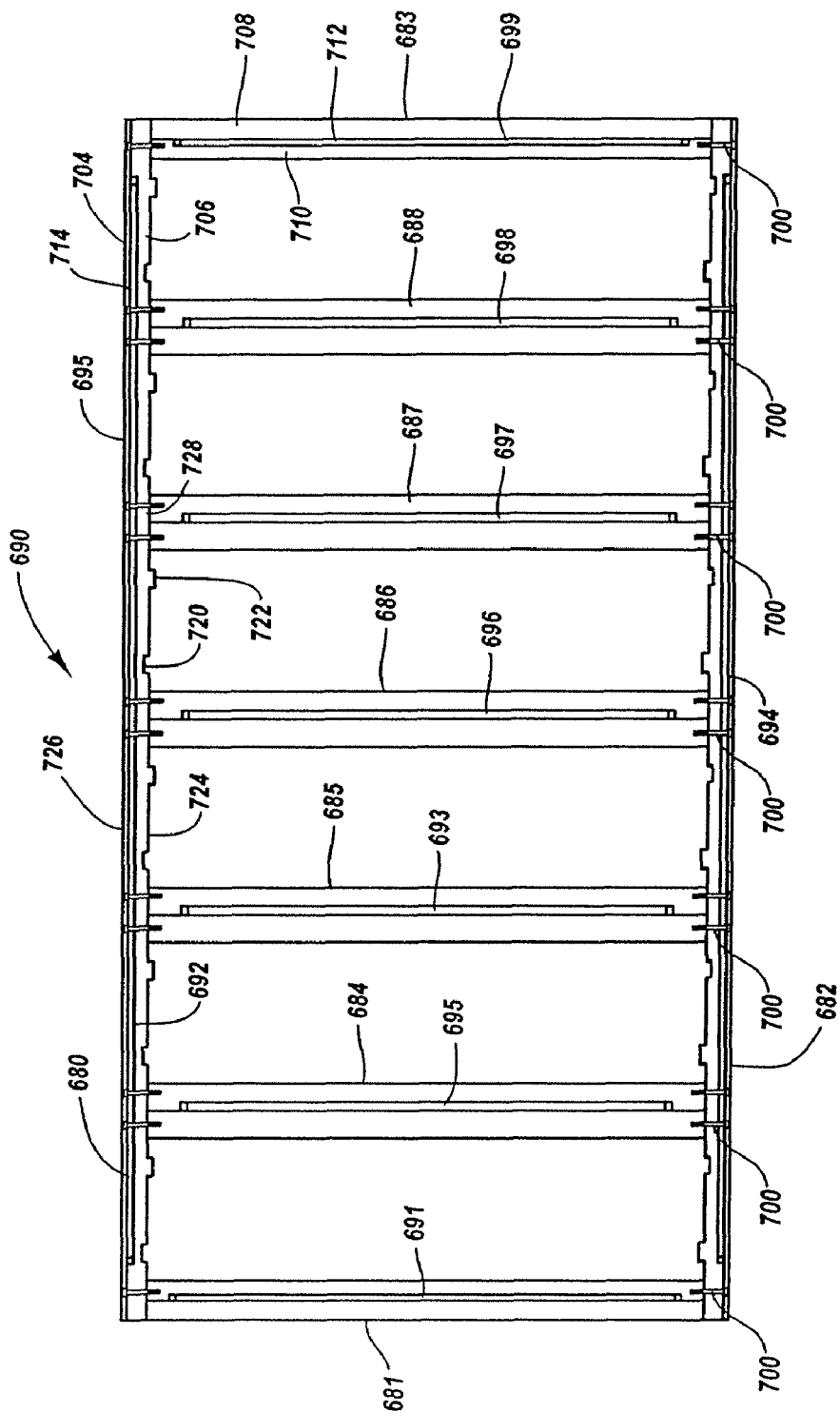
FIG. 20 is a top view of a plurality of panels assembled to form the mold illustrated in FIG. 13 in accordance with the principles of the present invention.
Figure 21:
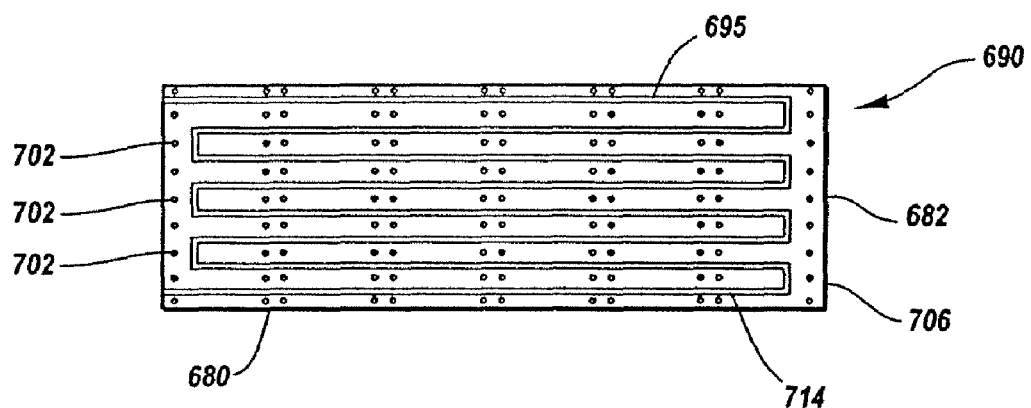
FIG. 21 is a back side view of a mold panel in accordance with the principles of the present invention.

As illustrated in FIG. 20, the panels 680-688 of a mold 690 in accordance with the present invention are provided with a plurality of heat pipes or pathways 691-699 for circulating water or another heated fluid through the mold 690. As shown in FIG. 21, the heat pipes, such as heat pipe 695, serpentine throughout the panel 680 to provide even heating throughout the mold 690. As previously discussed, the molds 690 are preferably heated to a temperature above the critical temperature of the foam in order to collapse the foam and form a dense outer layer or shell around the building units. Those skilled in the art will appreciate that the molds 690 may also be heated with electrical heating elements or other means known in the art.

Figure 22:
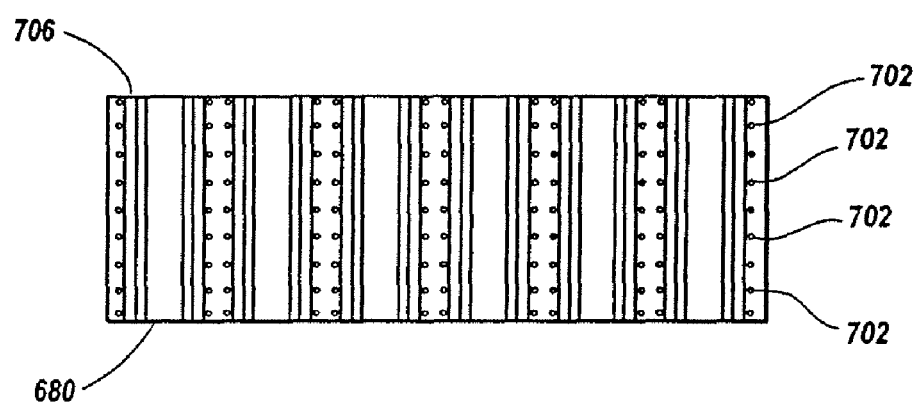
FIG. 22 is a front side view of the mold panel illustrated in FIG. 21.

As further shown in FIGS. 20, 21 and 22, the mold 690 is bolted together with a plurality of fasteners 700 that engage the panels 691, 693, 695, 696, 697, 698 and 699 through holes 702 and are secured into threaded holes in the panels. In addition, in order to define internal passageways to circulate water through each panel, each panel 691-699 is comprised of a pair of plates, such as plates 704 and 706 and plates 708 and 710. The passageways 712 and 714 are formed by cutting or milling channels in the plates 706 and 710 of the pair of plates. When the other plates 704 and 708 are attached to the first plates 706 and 710, respectively, as with rows of threaded fasteners in a patter similar to that shown with respect to panel 680, circulation passageways 714 and 712, respectively, are formed in the panels 692 and 699, respectively. Thus, with respect to plate 706, tongue and groove features 720 and 722 are formed on the front side 724 of the plate 706 while flow ways 714 are formed in the back 726 of the plate 706. For assembly purposes, recesses 728 may be formed in the plate 706 to receive the panels, such as panel 687.

Figure 23:
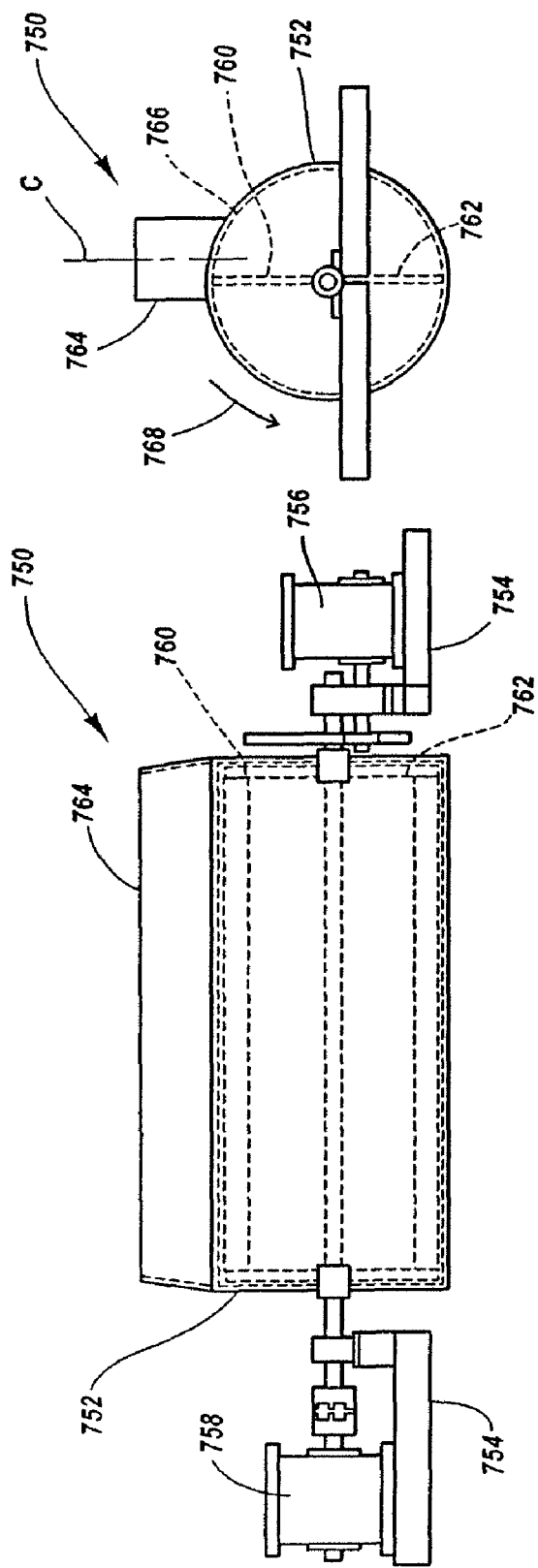
FIG. 23A is a side view of a mixing device in accordance with the principles of the present invention.
FIG. 23B is an end view of the mixing device illustrated in FIG. 23A.

Referring now to FIGS. 23A and 23B, a mixing device, generally indicated at 750, in accordance with the principles of the present invention, is illustrated. The mixer 750 is comprised of a generally cylindrical vessel 752 that is rotatably mounted proximate a longitudinal axis thereof to a support frame 754. The vessel 752 is coupled to a first drive motor 756 that may be controlled to rotate the vessel in order to dump its contents. A second drive motor 758 is coupled to the vessel 752 to rotate paddles 760 and 762 within the vessel 752 for mixing a cementitious slurry contained within the mixing vessel 752. An elongate spout 764 which preferably extends along a substantial length of the vessel 752 is provided to dispense slurry when the vessel 752 is rotated with motor 756. The spout 764 is attached to the vessel proximate to an around a perimeter of an opening 766 formed therein. The spout 764 is preferably tangentially offset relative to the vessel 752 such that the center line C of the spout 764 is spaced from and substantially parallel to a line defined by a diameter of the vessel 752. This tangential offset is preferably opposite to the direction of rotation of the vessel 752. Offsetting the spout 764 helps prevent slurry contained within the vessel 752 from prematurely flowing out of the spout 764 when the vessel 752 is rotated in the direction of arrow 768 when dispensing of the slurry is desired. When dispensing the slurry is desired, the motor 756 rotates the vessel 752 to a position where the spout 764 has been rotated approximately 180 degrees from the position shown in FIG. 23B. After dispensing the slurry, the vessel 752 is preferably further rotated in the direction of arrow 768 back to the position shown in FIG. 23B for receiving another batch of ingredients to be mixed.

Figure 24:
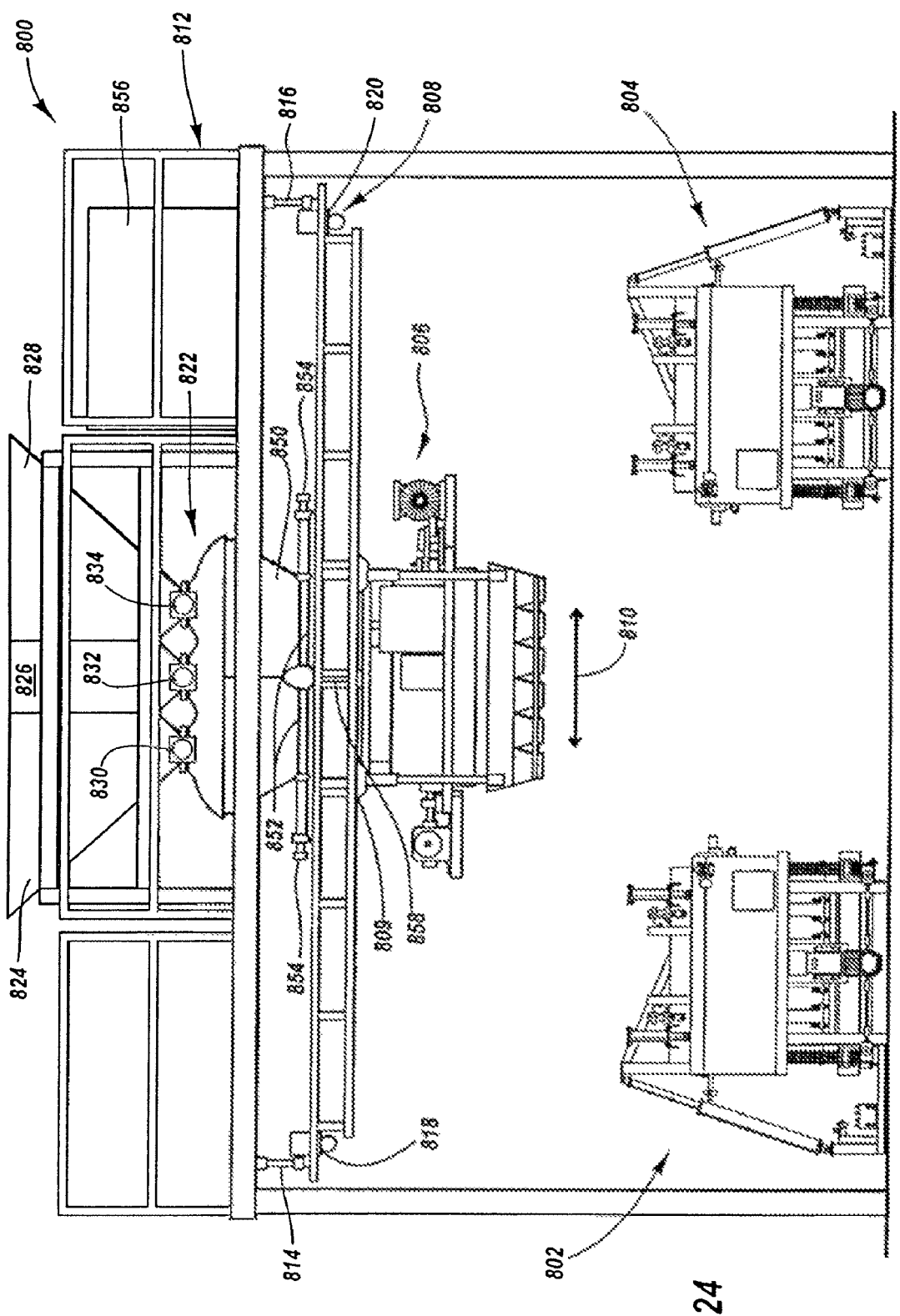
FIG. 24 is a front view of an apparatus for forming lightweight concrete building units in accordance with the principles of the present invention.

FIG. 24 illustrates a block manufacturing apparatus, generally indicated at 800, that utilizes the various new and novel devices described herein, for forming lightweight concrete blocks in accordance with the principles of the present invention. The apparatus 800 is comprised of a plurality of molds, two of which are indicated at 802 and 804, preferably arranged in rows or banks. A mixing device, generally indicated at 806 is suspended above the molds with an overhead truss, generally indicated at 808. The mixing device 806 can move in the direction of arrow 810 relative to the truss 808 for positioning over the molds 802 and 804. This is preferably accomplished by motor driven wheel/track arrangements 809 and 811. The truss 808 is attached to an overhead mezzanine structure, generally indicated at 812, and is movable relative thereto in a direction perpendicular to the arrow 810. Specifically, the truss 808 is coupled to tracks 814 and 816 and is motor driven with motors 818 and 820 for positioning the mixing device 806 in alignment with a desired mold.

In operation, the mixing device 806 is positioned below a "dry" ingredient measuring device, generally indicated at 822, comprising a plurality of hoppers 824, 826 and 828 for receiving three separate dry ingredients, preferably standard cement, sand, and a quick setting cement. At the bottom of each hopper 824, 826 and 828 are provided computer controllable valves or discharge control mechanisms 830, 832 and 834 that can selectively control the discharge of ingredients from the hoppers 824, 826 and 828, respectively.

Figure 25:
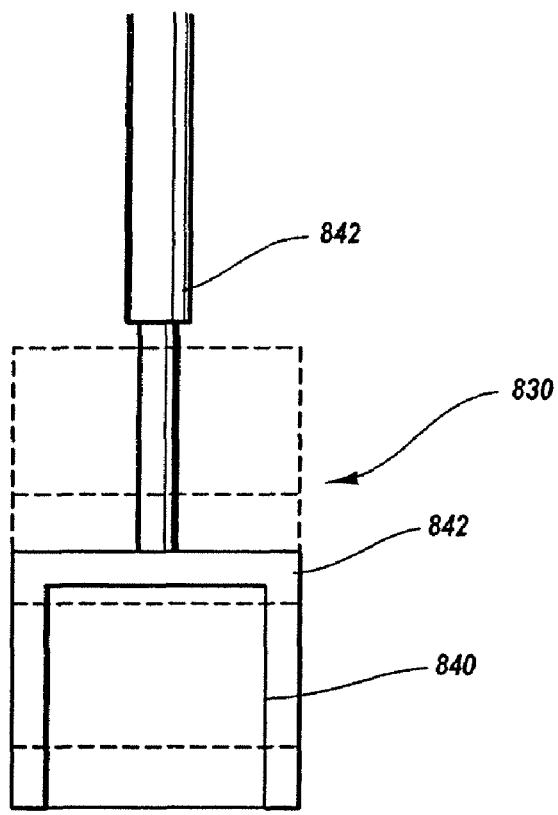
FIG. 25 is a top view of a hopper discharge control mechanism in accordance with the principles of the present invention.

As shown in FIG. 25, the discharge control mechanism 830 is comprised of a plate 842 that is slidably engaged with the opening 840 of the hopper 824. The position of the plate 842 relative to the opening 840 is controlled with an actuator 842, in this example a pneumatic piston, that can be extended or retracted to at least three positions. The discharge control mechanism 830 can close the opening 840 as is shown in solid lines or partially or completely open the opening 840 as is indicated by dashed lines. In order to better control measurement of the dry ingredients, the discharge control mechanism 830 can fully open the opening 840 to allow maximum flow of ingredient until the desired amount is nearly reached, for example about 90 percent of the desired amount. The plate 842 can then be positioned to partially close the opening 840 to restrict the flow of the ingredient until 100 percent of the desired amount is reached. As such, more accurate measurement is achieved while substantially maximizing the discharge flow rate.

The dry ingredients are measured by dispensing the ingredients from each of the hoppers 824, 826 and 828 into a weighing hopper 850 that include an electronic scale. The ingredients are individually dispensed into the hopper 850 such that a first ingredient is dispensed until a first desired weight is reached. Similarly, a second ingredient is dispensed until a second desired weight is reached. The third ingredient can then be dispensed until a third weight is reached. Of course, more or less ingredients can be dispensed in this manner depending on the composition of the cement.

After the ingredients have been measured, the ingredients are gravity fed into the mixer 806 through openings 852 in the hopper that are fully opened with actuators 854 similar to that shown with respect to FIG. 25. The dry ingredients are then mixed with foam produced by a foam generator 856. The foam is preferably dispensed through a line 858 that exits between the openings 852 of the hopper 850. Heated water is also provided in the mixer 806. The amount of water is preferably controlled by opening a valve for a set period of time in order to meter the water into the mixer 806.

Figure 26:
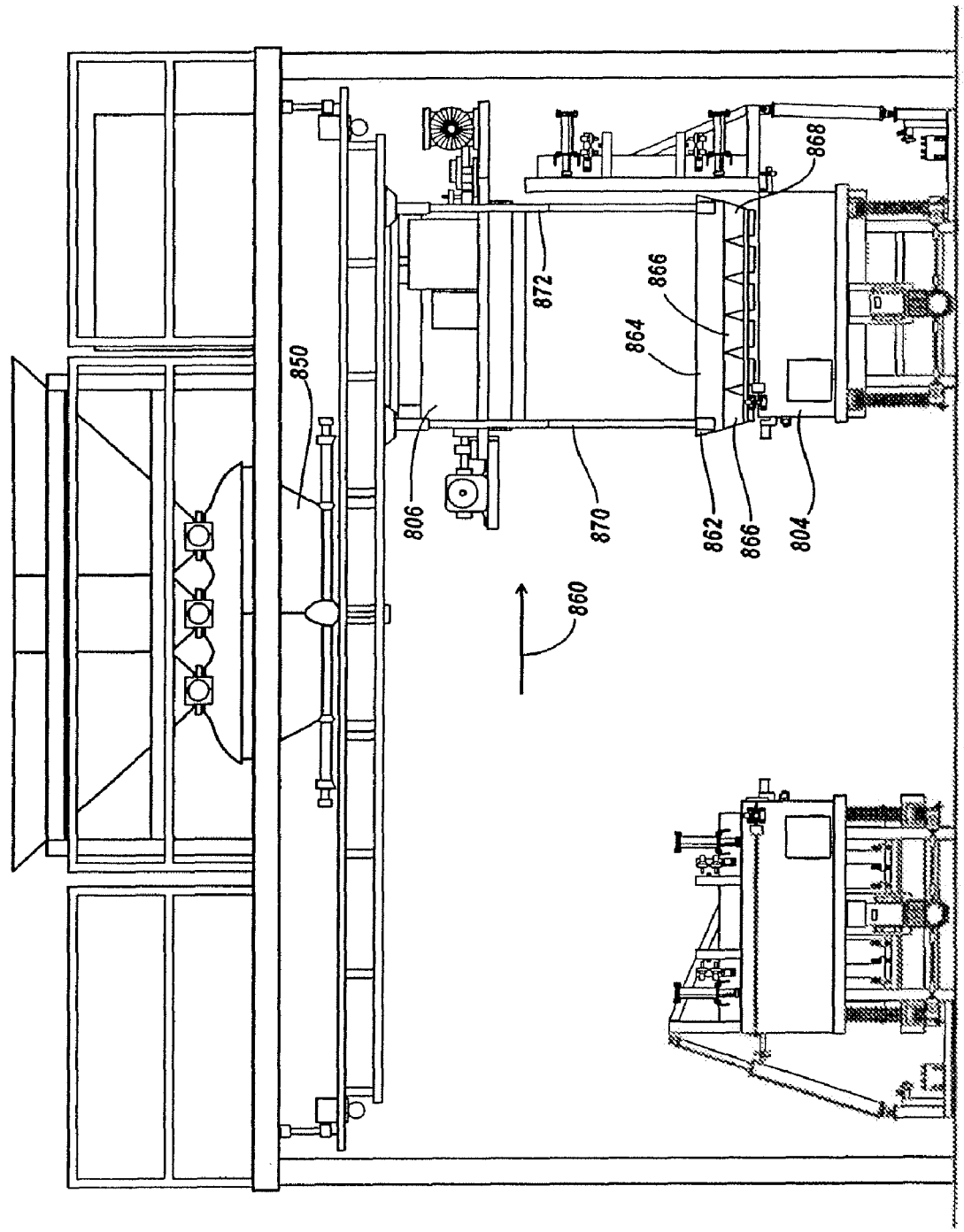
FIG. 26 is a front view of the apparatus shown in FIG. 24 with the mixing device positioned over a mold.

As shown in FIG. 26, once the ingredients are all in the mixer 806, the mixer can be moved from beneath the hopper while the mixing process occurs to efficiently utilize the slurry transport time to a mold 804. Preferably, the mixer is transported in a direction perpendicular to the arrow 860 until the mixer is aligned with the mold 804. The mixer is then moved in the direction of arrow 860 until the mixer is properly positioned above the mold 804. Preferably, this movement of the mixer occurs at two separate speeds, the first speed being faster than the second to quickly transport the mixer and thus the slurry to a position near the mold and then a second speed for precise positioning over the mold at a slower rate.

Once the mixer 806 is positioned over the mold, the mixer 806 is rotated to dispense the mixed slurry into a slurry dispensing hopper 862. The slurry hopper 862 is comprised of an open top portion 864 and a plurality of individual hoppers 866 at its bottom portion 868. The hopper 862 is sized such that a single slurry batch fills the hopper 862 above the tops of the individual hoppers 866. As such, when a single batch of slurry is poured from the mixer 806 into the hopper 862 the slurry is evenly distributed within the hopper 862 in the top portion 864. The hopper 862 is then lowered to the mold 804 with actuators 870 and 872. The individual hoppers 866 are then opened and the slurry is dispensed in substantially equal amounts through each individual hopper 866 into the mold. The individual hoppers 866 are provided in equal numbers for each of the individual mold chambers within the mold 804.

The hopper 862 is then raised to a position proximate the mixer 806 and the mixer is returned to a position below the weighing hopper 850 for receiving the next batch of dry ingredients. Preferably, the dry ingredients have been pre-measured while the mixer 806 was transporting the slurry to the mold 804.

It should be understood that the identification of the various steps of the process in accordance with the present invention have been provided with alphabetical identifiers in the claims for the sole purpose of providing easy reference to the various steps, but should not be construed as a limitation in defining the precise order in which such steps are to be performed. On the contrary, those skilled in the art after understanding the principles of the present invention will appreciate that the various steps of the process may be performed in any viable order. For example, the step of adding water to the mix may be performed before or after the dry ingredients are added to the mixer. Other such variations will become apparent to those of skill in the art upon review of the teachings of the present invention.

It will be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A system for forming lightweight concrete building units, comprising:
   at least one mold configured for receiving a batch of a lightweight cement slurry therein and for forming at least one building unit;
   an ingredient measuring apparatus configured for measuring each of a plurality of ingredients to form the batch;
   a cement slurry mixing apparatus configured for receiving the plurality of ingredients from the ingredient measuring apparatus, for mixing the plurality of ingredients into the batch, and for pouring the batch into at least one mold, wherein said cement slurry mixing device comprises a vessel rotatably mounted proximate a longitudinal axis thereof to a support frame and including a first drive motor coupled thereto for rotating said vessel to dump a batch contained therein and a second drive motor coupled to said vessel for rotating mixing paddles within said vessel and mixing the batch contained therein; and
   a slurry delivery apparatus configured for transporting said cement slurry mixing apparatus to a position proximate said at least one mold so that the batch slurry can be delivered from said cement slurry mixing apparatus to said at least one mold.

2. The system of claim 1, wherein said mold is configured for compressing the batch contained therein when said batch is in slurry form.

3. The system of claim 2, wherein said mold is configured for compressing the batch to form at least one building unit having relatively precise dimensions.

4. The system of claim 2, wherein said mold further includes means for heating said mold to increase the rate of cure of the batch of cement slurry contained therein.

5. The system of claim 1, wherein said ingredient measuring apparatus further comprises a plurality of hoppers for receiving a plurality of separate dry ingredients.

6. The system of claim 5, wherein each of said plurality of hoppers further comprises a plurality of discharge control mechanisms proximate a bottom of each of said plurality of hoppers for selectively controlling the discharge of the separate dry ingredients from each of said plurality of hoppers.

7. The system of claim 6, wherein each of said discharge control mechanisms comprises a plate slidably engaged with an opening in the bottom of each of said plurality of hoppers and an actuator coupled that can be extended and retracted coupled to said plate to slide said plate relative to said opening to selectively open, partially open and close said opening.

8. The system of claim 6, further including a weighing hopper comprising an electronic scale for receiving the separate dry ingredients from each of said plurality of hoppers and weighing each of the plurality separate dry ingredients until a desired weight is reached.

9. The system of claim 1, wherein said cement slurry mixing device further includes an elongate spout which extends along a substantial length of said vessel for dispensing the batch when the vessel is rotated with said first motor.

10. The system of claim 9, wherein said spout is attached to said vessel proximate to and around a perimeter of an opening formed therein and wherein said spout is tangentially offset relative to the vessel.

11. The system of claim 1, wherein said slurry delivery apparatus comprises an overhead truss and a motor driven wheel/track assembly, said cement slurry mixing device being attached to said overhead truss, said overhead truss movable by said motor driven wheel/track assembly for moving said truss and positioning said mixing device in alignment with said at least one mold.

12. The system of claim 1, further including a computer for controlling the operation of each of said at least one mold, said ingredient measuring apparatus, said cement slurry mixing apparatus, and said slurry delivery apparatus.

13. The system of claim 5, further comprising a foam generator for generating a foam and including a line that exits between openings of said plurality of hoppers of said ingredient measuring apparatus for dispensing the foam into the cement slurry mixing apparatus.

14. The system of claim 4, wherein said means for heating comprises a hot water source for supplying heated water to said mold for circulation there through and for supplying heated water to the cement slurry mixture for each batch thereof.

15. A system for forming lightweight concrete building units, comprising:
 a plurality of molds, each configured for receiving a batch of an aerated cement slurry therein and forming a plurality of building units from each batch;
 an automated ingredient measuring apparatus configured for weighing each of a plurality of dry ingredients to form a batch;
 a foam generator for feeding a metered amount of foam for each batch;
 a water source for supplying a metered amount of water for each batch;
 a vessel positionable beneath said measuring apparatus configured for receiving the plurality of dry ingredients from the automated ingredient measuring apparatus, the foam from said foam generator and the water from said water source, said vessel having mixing paddles therein for mixing the plurality of dry ingredients, the foam and the water into a batch of lightweight cement slurry, wherein said vessel is rotatably mounted proximate a longitudinal axis thereof to a support frame and includes a first drive motor coupled thereto for rotating said vessel to dump a batch contained therein and a second drive motor coupled to said vessel for rotating said mixing paddles; and
 a slurry delivery apparatus associated with said vessel capable of delivering a batch of lightweight cement slurry to each of said plurality of molds.

16. The system of claim 15, wherein said plurality of molds are arranged in at least one row, said vessel being movable from beneath said measuring apparatus to a desired mold in said row for delivery of a batch.

17. The system of claim 15, wherein each of said plurality of molds is configured for compressing a batch contained therein when the batch is in slurry form.

18. The system of claim 15, wherein each of said plurality of molds is configured for compressing the batch to form building units having relatively precise dimensions.

19. The system of claim 15, wherein each of said plurality of molds further includes means for heating said mold to a temperature that causes the foam to collapse in a layer of the batch that contacts the mold to form an outer, more dense layer of concrete in each building unit.

20. The system of claim 15, wherein said ingredient measuring apparatus further comprises a plurality of hoppers, each for receiving a separate dry ingredient and each including a discharge control mechanism for selectively controlling the discharge of the dry ingredient from each.

21. The system of claim 20, further including an electronic scale for receiving the separate dry ingredients from each of said plurality of hoppers and weighing each of the plurality separate dry ingredient until desired weight is reached for each.

22. The system of claim 15, wherein said vessel further includes an elongate spout extending along a substantial length of said vessel for dispensing a batch when the vessel is rotated with said first motor, said spout being tangentially offset relative to said vessel.

23. The system of claim 15, further including a computer for controlling the operation of each of plurality of molds, said ingredient measuring apparatus, said foam generator, said water source, said vessel, and said slurry delivery apparatus.

* * * * *